(12) United States Patent
Neubauer et al.

(10) Patent No.: US 10,960,628 B2
(45) Date of Patent: Mar. 30, 2021

(54) TIRE CARCASS PLY JOINING APPARATUS AND METHOD

(71) Applicant: THE GOODYEAR TIRE & RUBBER COMPANY, Akron, OH (US)

(72) Inventors: Robert Anthony Neubauer, Medina, OH (US); Ryan Michael Schmidt, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1317 days.

(21) Appl. No.: 14/854,290

(22) Filed: Sep. 15, 2015

(65) Prior Publication Data

US 2017/0072652 A1    Mar. 16, 2017

(51) Int. Cl.
*B29D 30/42* (2006.01)
*B29C 65/62* (2006.01)
(Continued)

(52) U.S. Cl.
CPC ............ *B29D 30/42* (2013.01); *B29C 65/483* (2013.01); *B29C 65/5057* (2013.01);
(Continued)

(58) Field of Classification Search
CPC ..... B29C 65/02; B29C 65/50; B29C 65/5057; B29C 65/5064; B29C 65/5071;
(Continued)

(56) References Cited

U.S. PATENT DOCUMENTS

| 2,681,684 A | | 6/1954 | Dario Giletta et al. |
| 3,586,581 A | * | 6/1971 | Todd .................. B29C 63/0039 156/467 |

(Continued)

FOREIGN PATENT DOCUMENTS

| CN | 101973133 A | 2/2011 |
| CN | 102806675 A | 12/2012 |

(Continued)

OTHER PUBLICATIONS

European Search Report dated Feb. 2, 2017 for Application Serial No. EP16186760.

(Continued)

*Primary Examiner* — Philip C Tucker
*Assistant Examiner* — Brian R Slawski
(74) *Attorney, Agent, or Firm* — Robert N. Lipcsik

(57) ABSTRACT

A method forms a butt joint between ends of first and second plies and splices the first and second plies together. The method includes the steps of: positioning a first splice edge of a first ply at a first location; positioning a second splice edge of a second ply at a second location, the second splice edge being left bare; wrapping a gum strip around the first splice edge such that the first gum strip forms a U-shaped structure in section that allows the first gum strip to extend from a first planar side of the first ply over the first splice edge to a second opposite planar side of the first ply; not wrapping a gum strip around the second splice edge; placing the first splice edge in abutting relationship to the second splice edge; and stitching the first splice edge to the second splice edge such that stitches each extend from the first planar side of the first ply, through the gum strip, to the first planar side of the second ply.

5 Claims, 23 Drawing Sheets

(51) Int. Cl.
    *B29C 65/00*     (2006.01)
    *B29D 30/30*     (2006.01)
    *B29C 65/50*     (2006.01)
    *B29C 65/72*     (2006.01)
    *B29D 30/00*     (2006.01)
    *B29C 65/78*     (2006.01)
    *B29C 65/48*     (2006.01)
    *B29K 105/00*     (2006.01)
    *B29K 21/00*     (2006.01)
    *B29K 105/24*     (2006.01)
    *B29K 305/12*     (2006.01)
    *B29C 35/02*     (2006.01)
    *B29L 30/00*     (2006.01)
    *B29D 30/38*     (2006.01)

(52) U.S. Cl.
    CPC ...... *B29C 65/5071* (2013.01); *B29C 65/5085* (2013.01); *B29C 65/5092* (2013.01); *B29C 65/62* (2013.01); *B29C 65/72* (2013.01); *B29C 65/7802* (2013.01); *B29C 65/7841* (2013.01); *B29C 65/7847* (2013.01); *B29C 66/1142* (2013.01); *B29C 66/435* (2013.01); *B29C 66/71* (2013.01); *B29C 66/72141* (2013.01); *B29C 66/73752* (2013.01); *B29C 66/8221* (2013.01); *B29C 66/855* (2013.01); *B29D 30/0016* (2013.01); *B29D 30/3007* (2013.01); *B29C 35/02* (2013.01); *B29C 66/7212* (2013.01); *B29D 2030/0038* (2013.01); *B29D 2030/381* (2013.01); *B29D 2030/421* (2013.01); *B29D 2030/422* (2013.01); *B29K 2021/00* (2013.01); *B29K 2105/246* (2013.01); *B29K 2105/256* (2013.01); *B29K 2305/12* (2013.01); *B29L 2030/003* (2013.01)

(58) Field of Classification Search
    CPC . B29C 65/5092; B29C 65/72; B29C 66/1142; B29C 66/43; B29C 66/71; B29C 66/712; B29C 35/02; B29C 65/483; B29C 65/5085; B29C 65/62; B29C 65/7802; B29C 65/7841; B29C 65/7847; B29C 66/114; B29C 66/41; B29C 66/435; B29C 66/7212; B29C 66/72141; B29C 66/73152; B29C 66/73751; B29C 66/73752; B29C 66/73755; B29C 66/80; B29C 66/8221; B29C 66/855; B29D 30/42; B29D 2030/422; B29D 30/0016; B29D 30/3007; B29D 2030/0038; B29D 2030/381; B29D 2030/421; B29L 2030/003; B29K 2021/00; B29K 2105/246; B29K 2105/256; B29K 2305/12; B29K 2030/003

USPC ...... 156/60, 88, 91, 92, 93, 110.1, 111, 118, 156/122, 134, 196, 216, 217, 218, 250, 156/256, 264, 304.1, 304.3, 304.5, 304.6, 156/306.6, 306.9, 307.1, 349, 350, 362, 156/367, 368, 378, 394.1, 421, 421.6, 156/443, 475, 510, 516, 517, 521, 538, 156/539, 556, 580, 583.1; 152/548, 560, 152/565
    See application file for complete search history.

(56) References Cited

U.S. PATENT DOCUMENTS

| | | | |
|---|---|---|---|
| 4,322,462 A * | 3/1982 | Lucas | B65D 88/50 156/157 |
| 4,466,473 A | 8/1984 | Matyja et al. | |
| 4,588,463 A * | 5/1986 | Barber | B31F 1/0029 156/200 |
| 4,733,709 A | 3/1988 | Lambillotte et al. | |
| 5,004,516 A * | 4/1991 | Koga | B29C 53/043 156/463 |
| 5,062,462 A | 11/1991 | Rye et al. | |
| 5,605,596 A * | 2/1997 | McLaughlin | B29C 63/0039 156/202 |
| 6,109,322 A | 8/2000 | Benzing, II et al. | |
| 6,129,129 A | 10/2000 | Chandezon et al. | |
| 6,280,548 B1 | 8/2001 | Benzing, II et al. | |
| 6,503,354 B1 * | 1/2003 | Martindale | B60C 11/032 152/209.17 |
| 7,073,552 B2 | 7/2006 | Dyrlund et al. | |
| 8,685,199 B2 | 4/2014 | Dyrlund et al. | |
| 2004/0118513 A1 * | 6/2004 | Dyrlund | B29C 65/483 156/304.1 |
| 2011/0061783 A1 * | 3/2011 | Itoh | B29D 30/42 152/565 |

FOREIGN PATENT DOCUMENTS

| | | | | |
|---|---|---|---|---|
| DE | 102005010467 A1 * | 9/2006 | | B29C 65/5057 |
| DE | 102005010467 A1 | 9/2006 | | |
| EP | 1431023 A2 | 6/2004 | | |
| GB | 190627031 A | 11/1907 | | |
| GB | 833994 A * | 5/1960 | | B60C 3/02 |
| GB | 1389095 A * | 4/1975 | | B29C 63/0034 |
| GB | 1389095 A | 4/1975 | | |
| JP | 0680001 A | 3/1994 | | |

OTHER PUBLICATIONS

Translation of Chinese Search Report for Serial No. 201610827069.0 dated Jun. 19, 2018.

* cited by examiner

TIRE CARCASS PLY JOINING APPARATUS AND METHOD

FIELD OF THE INVENTION

The present invention relates generally to an apparatus and method for producing a continuous preparation ply material for making pneumatic tires and, more particularly, to an apparatus and method for making a continuous carcass ply from multiple pieces.

BACKGROUND OF THE INVENTION

In the construction of a radial ply tire, a carcass consisting of one or more preparation plies of elastomeric material is built up on a generally cylindrical drum. The preparation ply is applied so that reinforcing cords run from bead to bead in a direction that is generally parallel to the axis of the drum. Thus, prior to making the carcass, the preparation ply with the transversely extending reinforcing cords must first be made.

It is known to manufacture the preparation ply by first producing a sheet of elastomeric material in which reinforcing cords extend longitudinally. During production, the sheet of elastomeric material passes between calendering rolls. The calendered sheet of material is then cut into quadrilateral, for example, rectangular pieces, reoriented, and the calendered edges are then spliced together to form a continuous strip of preparation ply material. The reorientation results in the reinforcing cords extending substantially parallel to the splice joints and substantially perpendicular to the longitudinal direction of the preparation ply strip.

If the elastomeric material has metallic reinforcing cords, the lateral calendered edges of the material have relatively straight and uniform edges. Thus, in the manufacture of a preparation ply that has metallic reinforcing cords, the adjacent ends of the strips are placed in direct opposition and brought together without any overlap of the ends to form an end-to-end, or butt joint, splicing the two ends together. Thus, the ends are held together only by the tackiness of the uncured rubber over the area of the adjacent ends. Metallic reinforcing cords provide a relatively linear calendered edge that is suitable for a butt splice bond created by the tackiness of the elastomeric material.

However, if the elastomeric material has nonmetallic reinforcing cords, the lateral calendered edges of the material are not straight but undulating. Such curved calendered edges provide a non-uniform and variable gap between the adjacent ends of the pieces and thus, are generally not considered suitable for a butt splice. Consequently, although a butt splice would be preferred in the manufacture of a preparation splice, an overlapping splice is often used to join the cut pieces having nonmetallic reinforcing cords. Therefore, there is a need for improved apparatus and method for automatically making a preparation ply with butt splices.

SUMMARY OF THE INVENTION

A first method in accordance with the present invention forms a butt joint between ends of first and second plies and splices the first and second plies together. The first method includes the steps of: positioning a first splice edge of a first ply at a first location; positioning a second splice edge of a second ply at a second location; wrapping a gum strip around the first splice edge such that the gum strip forms a U-shaped structure in section that allows the gum strip to extend from a first planar side of the first ply over the first splice edge to a second opposite planar side of the first ply; not wrapping a second gum strip around the second splice edge; placing the first splice edge in abutting relationship to the second splice edge; stitching the first splice edge to the second splice edge such that stitches each extend from the first planar side of the first ply, through the gum strip, to a first planar side of the second ply; and curing the first splice edge to the second splice edge.

According to another aspect of the first method, the first and second plies both have parallel wire cords spaced a predetermined distance apart.

According to still another aspect of the first method, the gum strip has a nominal thickness equal the predetermined distance of the first and second plies. Because gum strip thickness may vary plus or minus 35% to 65%, the predetermined distance for the butt splice may vary correspondingly plus or minus 70% to 130%.

According to yet another aspect of the first method, each stitch extends from the gum strip to the second ply.

According to still another aspect of the first method, the gum strip is constructed of a material at least 20% softer than a substrate material of the first and second plies.

A second method forms a continuous material ply of the type used to make vehicle tires with the continuous material ply being made by joining multiple plies. The second method includes the steps of: positioning a first splice edge of a first ply at a first location; positioning a second splice edge of a second ply at a second location; wrapping a gum strip around the first splice edge such that the gum strip forms a U-shaped structure in section that allows the gum strip to extend from a first planar side of the first ply over the first splice edge to a second opposite planar side of the first ply; not wrapping a gum strip around the second splice edge; placing the first splice edge in abutting relationship to the second splice edge at a third location; stitching the first splice edge to the second splice edge such that stitches each extend from the first planar side of the first ply, through the gum strip, to a first planar side of the second ply; and curing the first splice edge to the second splice edge.

According to another aspect of the second method, the second method further includes the steps of: providing pairs of upper racks having teeth and extending end-to-end having first upper racks movable with respect to second upper racks; providing pairs of lower racks having teeth and extending end-to-end adjacent the pairs of upper racks, the pairs of lower racks having first lower racks movable with respect to second lower racks; positioning the first edge of the first over teeth of the first lower racks; positioning the second edge of the second ply over teeth of the second lower racks; and clamping the first and second plies between the pairs of upper racks and the pairs of lower racks; simultaneously engaging teeth of all first upper racks with teeth of all second upper racks; and teeth of all first lower racks with teeth of all second lower racks to firmly press the first edge of the first ply against the second edge of the second ply to splice the first and second plies together.

According to still another aspect of the second method, the gum strip is constructed of a material at least 20% softer than a substrate material of the first and second plies.

A system in accordance with the present invention forms a continuous material ply of the type used to make vehicle tires with the continuous material ply being made by joining multiple plies. The system includes: positioning a first splice edge of a first ply at a first location; positioning a second splice edge of a second ply at a second location; wrapping a gum strip around the first splice edge such that the gum strip forms a U-shaped structure in section that allows the gum strip to extend from a first planar side of the first ply over the first splice edge to a second opposite planar side of the first ply; not wrapping a gum strip around the second splice edge; placing the first splice edge in abutting relationship to the second splice edge at a third location; stitching the first splice edge to the second splice edge such that stitches each extend from the first planar side of the first ply, through the gum strip, to a first planar side of the second ply; and curing the first splice edge to the second splice edge.

According to another aspect of the system, an apparatus applies a gum strip at a butt joint thereby splicing the first edge to the second edge. The apparatus may include a conveyor for providing gum strips having a desired length and thickness; and a transfer device for automatically removing the gum strips from the conveyor and placing the gum strip at the butt joint.

According to still another aspect of the system, the transfer device comprises a vacuum head.

According to yet another aspect of the system, the vacuum head is resiliently mounted to the transfer device to provide a force against the gum strip upon the gum strip being placed at the butt joint.

According to still another aspect of the system, a cutting apparatus automatically cuts the gum strip to the desired length.

According to yet another aspect of the system, a controller is operatively connected to the conveyor and the transfer device to operate the conveyor and the transfer device.

According to still another aspect of the system, the gum strip is constructed of a material at least 20% softer than a substrate material of the first and second plies.

An apparatus for use with the present invention is provided that automatically butt splices a preparation ply having metallic or nonmetallic reinforcing cords. The apparatus is relatively simple in design and less expensive than other machinery used to butt splice a preparation ply. The apparatus provides a high quality butt splice regardless of the reinforcing cord material and therefore, is especially useful in making a preparation ply having nonmetallic reinforcing cords.

More specifically, the apparatus forms a butt joint between ends of first and second plies to splice the plies together. The apparatus has pairs of upper racks that extend end-to-end and each pair of upper racks has first and second upper racks that are movable with respect to each other. In addition, pairs of lower racks extend end-to-end adjacent the pairs of upper racks, and each pair of lower racks has first and second lower racks that are movable with respect to each other. The first and second lower racks support ends of first and second plies, respectively. A clamp drive is connected to the pairs of upper racks and is operable to move the upper racks toward the lower racks to clamp the ends of the first and second plies between the upper and lower racks. An engagement drive is connected to the upper and lower racks and is operable to simultaneously move all of the first and second racks with respect to each other to firmly press the ends of the first and second plies together, thereby forming a butt joint splicing the ends of the first and second plies together.

The apparatus automatically applies a gum strip to a butt joint joining two preparation plies together. The apparatus is fast, reliable and automatically operable with the butt splicer described herein and therefore, is especially useful in making a preparation ply having nonmetallic reinforcing cords.

More specifically, the apparatus has a conveyor for providing a gum strip of a desired length. A transfer device then automatically removes the gum strip from the conveyor and places the gum strip on the butt joint.

A third method for use with the present invention positions an end of a first material ply section over teeth of the first lower racks and positioning an end of a second material ply section over teeth of the second lower racks. Next, the first and second material ply sections are clamped between the pairs of upper racks and the pairs of lower racks. Then, the teeth of all the first upper and lower racks are simultaneously engaged with the teeth of all the second upper and lower racks to firmly press the ends of the first and second material plies together to form a butt joint that splices the first and second material plies together. The third method applies a gum strip only over a butt joint splicing end of first preparation ply by providing a gum strip having a desired length and then, automatically placing the gum strip on the butt joint.

These and other objects and advantages of the present invention will become more readily apparent during the following detailed description taken in conjunction with the drawings.

BRIEF DESCRIPTION OF THE DRAWINGS

The present invention will be described by way of example and with reference to the accompanying drawings, in which.

DETAILED DESCRIPTION OF EXAMPLES OF THE PRESENT INVENTION

Figure 4:
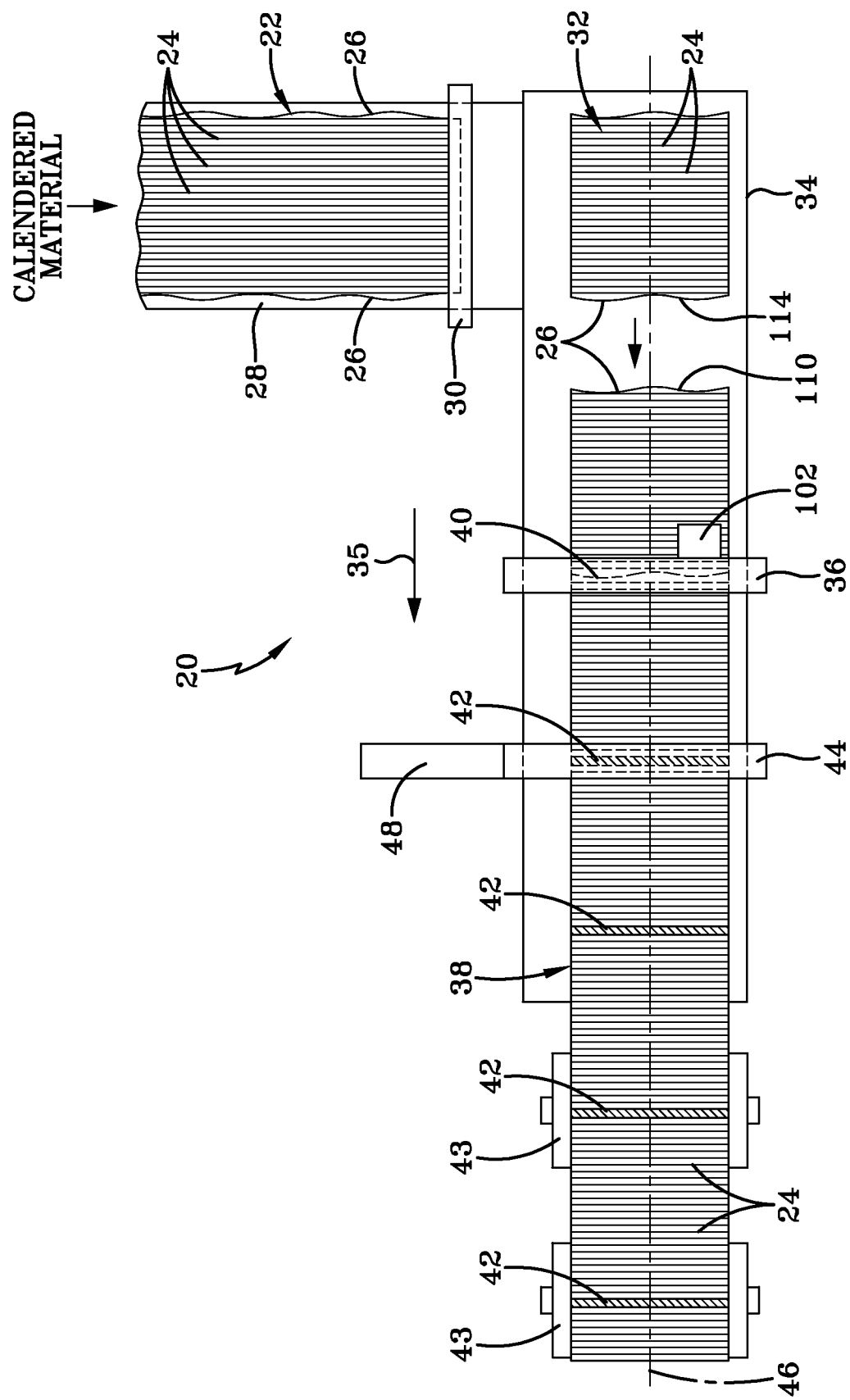
FIG. 4 is a schematic illustration of a cord preparation ply manufacturing line having a butt splicer and gum strip applier for use with the present invention.

Referring to FIG. 4, in a preparation ply manufacturing line 20, a strip of calendered material 22 may be fed from calender rolls (not shown) in a known manner. The calendered material 22 may be 0.040 inch to 0.060 inch thick and have cords 24 made from a metallic or nonmetallic material extending longitudinally generally parallel to the calendered edges 26. Non-metallic cords 24 may be less rigid than metallic cords resulting in the calendered edges 26 being nonlinear and undulating. The calendered material may be fed by a conveyor 28 past a cutter 30, which cuts the calendered material 22 to desired lengths, depending on the application. The resulting rectangular pieces 32 may then be transferred onto a transverse infeed conveyor 34. The pieces may then be conveyed in a downstream direction 35 to a butt splicing machine 36 that forms butt joints 40 between the calendered edges 26 of the cut pieces 32 to form a continuous preparation ply strip 38. The butt joints 40 may be reinforced by respective gum strips 42 that are placed over the joints 40 by a gum strip applier 44. The resulting continuous preparation ply strip may be collected on windup rolls 43 in a known manner. The continuous preparation ply strip 38 may have nonmetallic cords 24 that are substantially parallel to the butt joints 40 and gum strips 42 and are transverse to a longitudinal axis 46 of the preparation ply strip 38.

For purposes of this description, the term "downstream" is used to identify the direction of motion of the preparation ply material 38 through the butt splicer 36 and gum strip applier 44 (e.g., from right to left as viewed in FIG. 4). The term "upstream" is used to designate a motion in an opposite direction. Components of the butt splicer 36 that are identified as "downstream" are located closer to the gum strip applier 44 than components identified as being "upstream".

Figure 5:
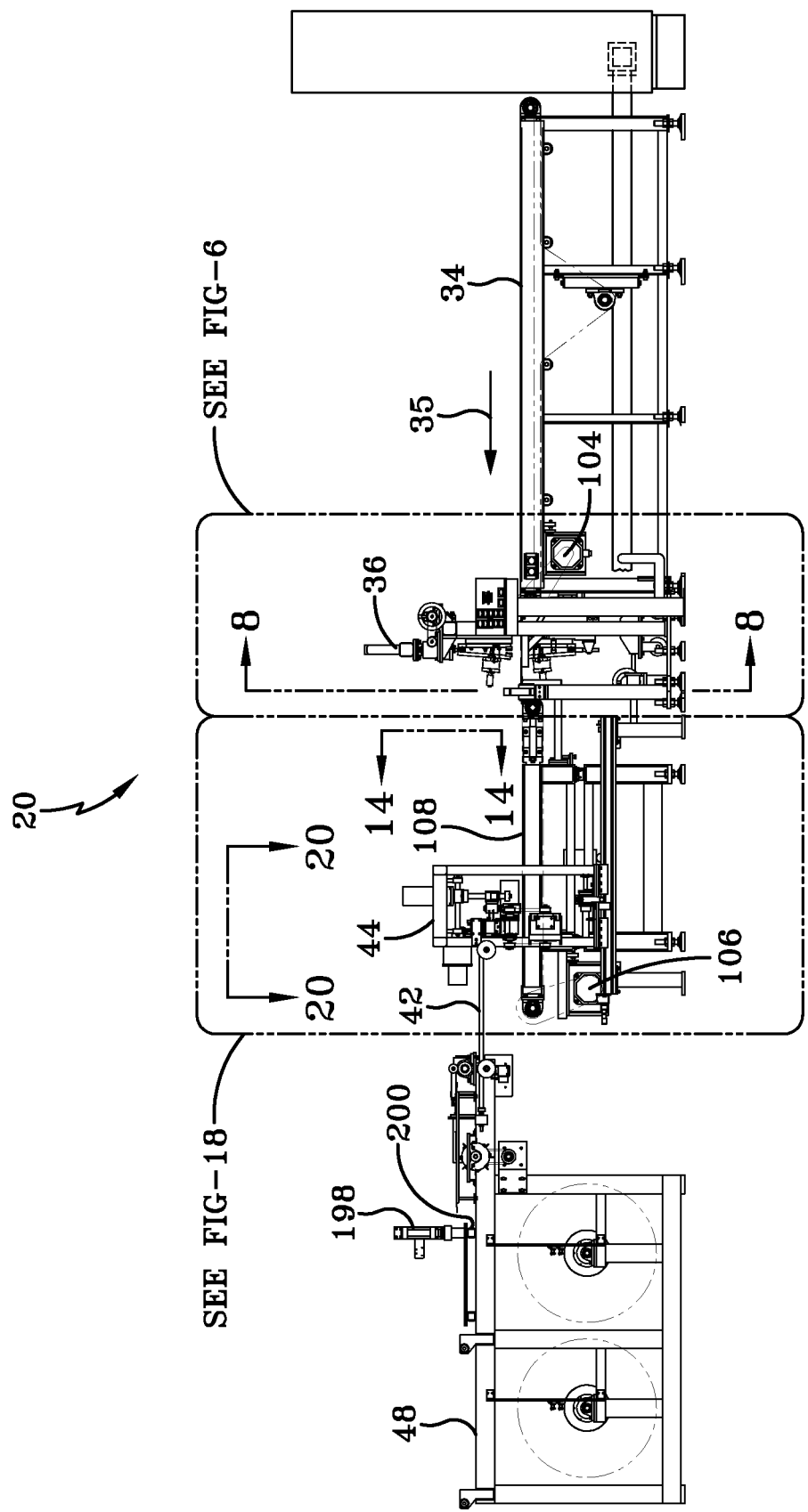
FIG. 5 is a side view of the butt splicer and the gum strip applier of FIG. 4.

FIG. 5 is a side view of a portion of the preparation ply manufacturing line 20 and a strip of calendered material 22 that includes the infeed conveyor 34, the butt splicer 36, and the gum strip applier 44. Preparation equipment 48 for the gum strip applier 44 may feed the gum strip from a roll and separate and wind up a covering over the gum strip adhesive.

Figure 7:
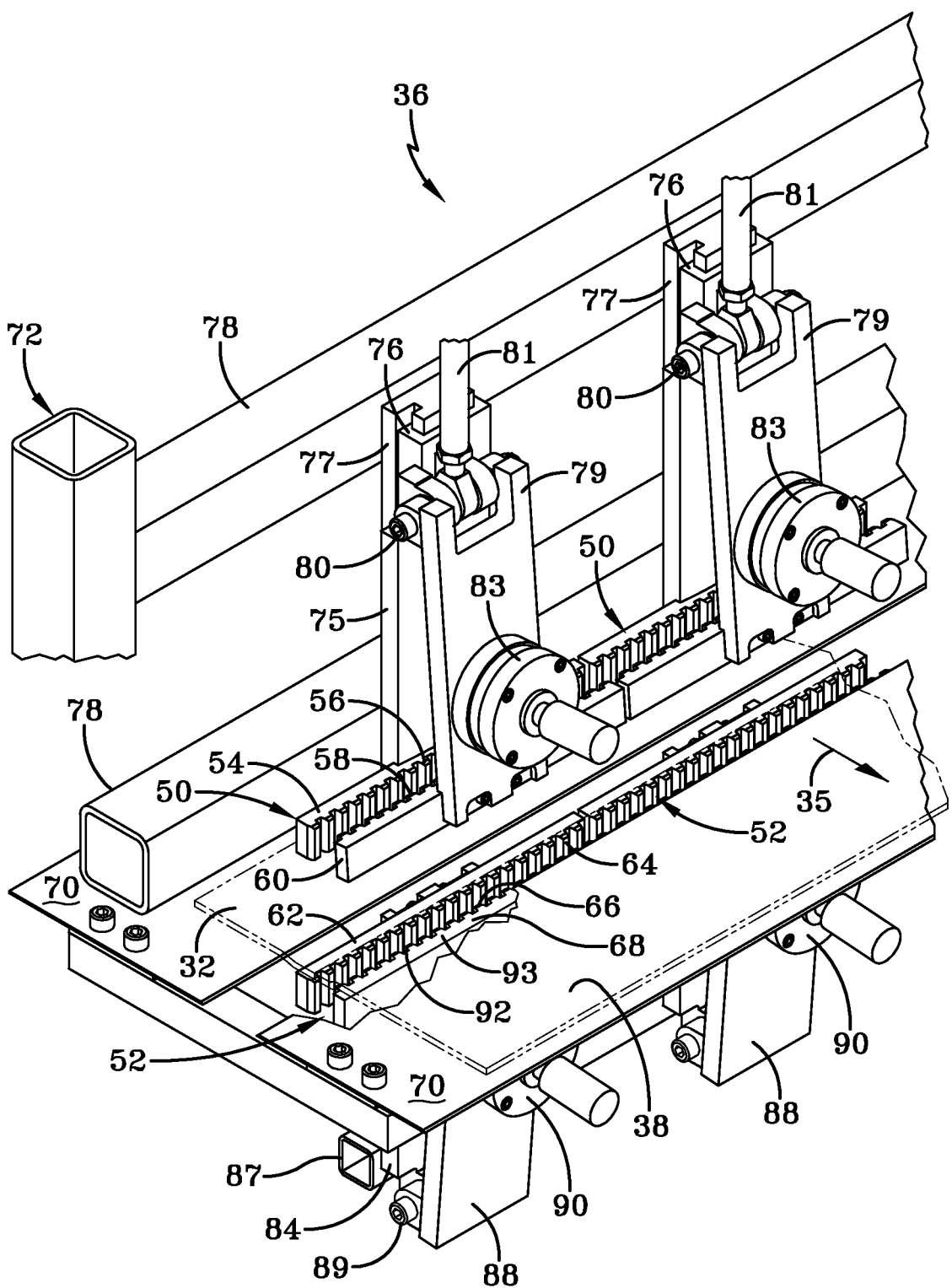
FIG. 7 is a partial perspective view of a portion of the butt splicer of FIG. 5 that illustrates the plurality of pairs of upper and lower racks.
Figure 8:
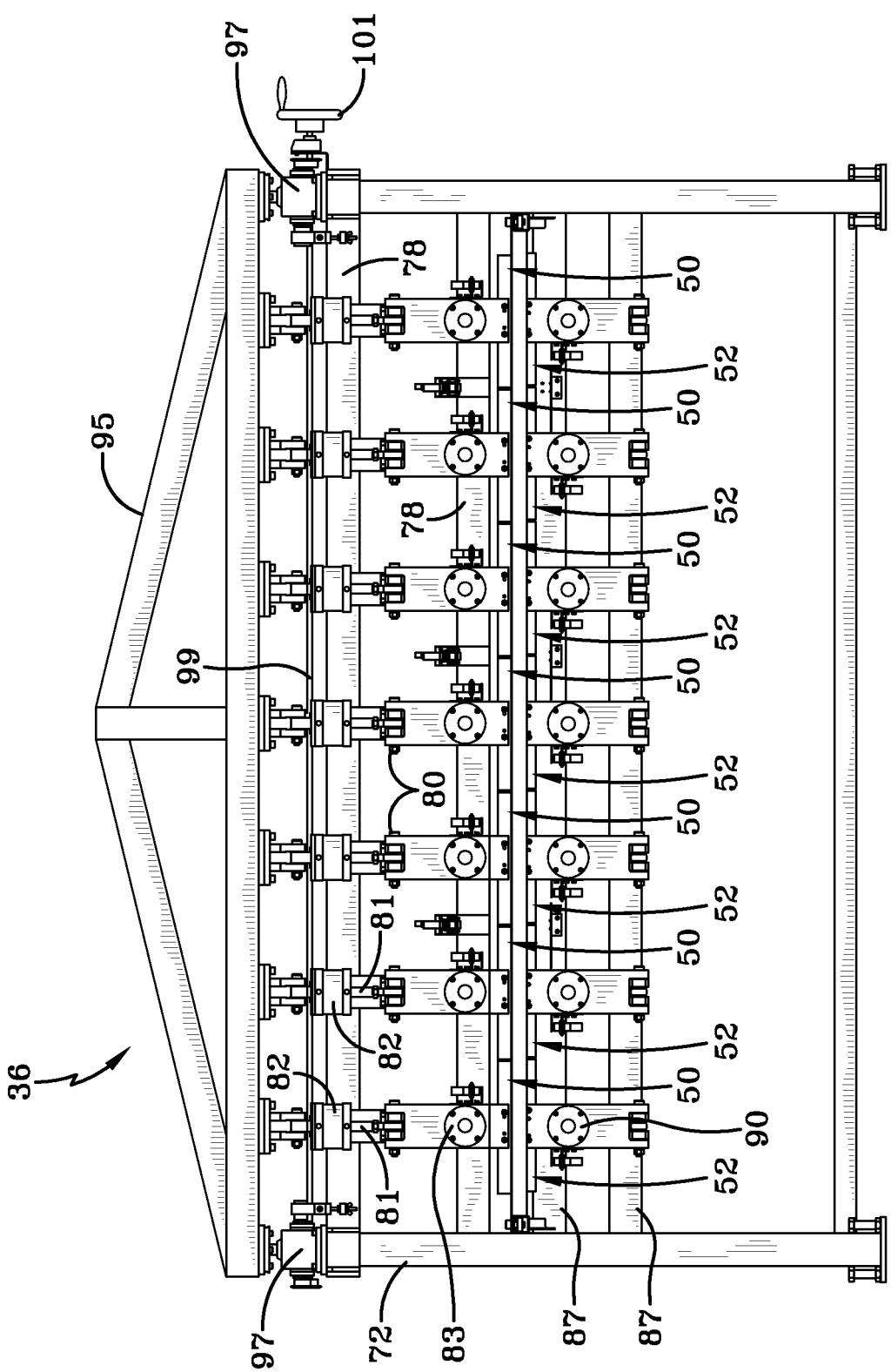
FIG. 8 is an end view of the butt splicer of FIG. 5.

Referring to FIGS. 7 and 8, the butt splicing machine 36, or butt splicer, may have a frame 72 that supports floating tables 70 on both the upstream and downstream sides of the butt splicing machine. Pairs of upper racks 50 and pairs of lower racks 52 may be mounted to extend transversely across the width of the butt splicing machine 36. Each pair of upper racks 50 may comprise a nonpivotable upstream rack 54 having teeth 56 engageable with teeth 58 of a pivotable downstream rack 60. Similarly, each pair of lower racks 52 may comprise a nonpivotable upstream rack 62 having teeth 64 engageable with teeth 66 of a pivotable downstream rack 68. The pairs of lower racks 52 may be fixed in elevation immediately adjacent the table 70 that supports the cut strips 32 being fed by the infeed conveyor 34 to the butt splicer 36.

Each of the upper upstream racks 54 may be mounted to a lower end of a respective upper nonpivotable upstream jaw mounting bracket 75 mounted on a slide 76. The slide 76 may be slidably mounted on a linear guide 77 fixed to an upper pair of cross rails 78 of the frame 72. Each of the upper downstream racks 60 may be mounted to a lower end of a respective upper pivotable downstream jaw mounting bracket 79. Upper ends of each of the upper jaw mounting brackets 75, 79 may be mechanically connected to a clamp drive comprised of a respective upper clamping actuator 82 (e.g., a pneumatic cylinder as shown in FIG. 8). The cylinders 82 may be re mounted to a truss 95 mounted on gearboxes 97 on the frame 72.

The gearboxes 97 may be connected by a shaft 99 and operated by a handwheel 101. Thus, turning the handwheel 101 may adjust the vertical position of the cylinders 82 and the upper pairs of racks 50. The upper ends of each of the jaw mounting brackets 75, 79 may be pivotally connected via a pivot pin 80 to a distal end of a cylinder rod 81 of a respective cylinder 82. Simultaneous operation of the cylinders 82 may simultaneously move the upper jaw mounting brackets 75, 79 and respective pairs of upper racks 50 downward toward the pairs of lower racks 52. Reversing the operation of the cylinders 82 may move the upper racks 50 away from the lower racks 52.

Figure 6:
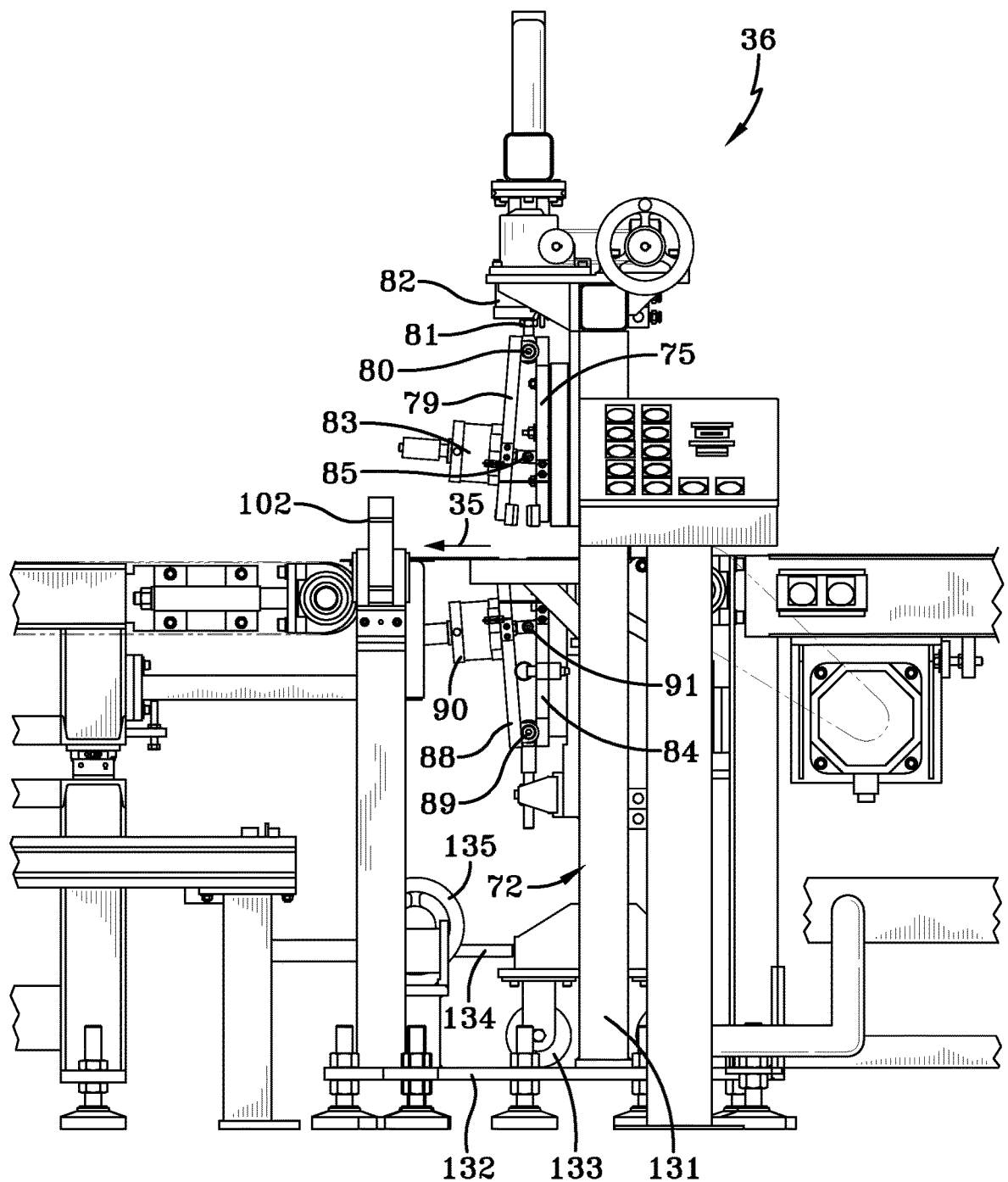
FIG. 6 is a side view of the butt splicer of FIG. 5.

As shown in FIG. 7, the upper downstream, racks 60 may be pivotable with respect to respective upper upstream racks 54 by means of an engagement drive comprised of respective upper engagement actuators 83 (e.g., a pneumatic cylinder). Specifically, the cylinders 83 may be mounted on respective upper downstream jaw mounting brackets 79; and, as shown in FIG. 6, distal ends of respective cylinder rods 85 may be connected to respective opposed upper upstream jaw mounting brackets 75. Simultaneous operation of the engagement actuators 83 may cause the upper downstream jaw mounting brackets 79 and respective upper downstream racks 60 to pivot toward the upper upstream jaw mounting brackets 75 and the respective upper upstream racks 54, thereby engaging their respective teeth 58, 56. Reversing the operation of the engagement cylinders 83 may cause the upper downstream racks 60 to move simultaneously away from the upper rear racks 54, thereby disengaging their respective teeth 58, 56.

Each of the lower upstream racks 62 may be mounted to a lower end of a respective lower upstream nonpivotable jaw mounting bracket 84 attached to a lower pair of cross rails 87 fixed to the frame 72. Each of the lower downstream racks 68 may be mounted to a lower end of a respective lower pivotable downstream jaw mounting bracket 88. Upper ends of each of the lower jaw mounting brackets 84, 88 may be pivotally connected via a pivot pin 89. The lower downstream racks 68 may be pivotable with respect to respective lower upstream racks 62 by means of an engagement drive comprised of respective lower engagement actuators 90 (e.g., pneumatic cylinders). Specifically, the actuators 90 may be mounted on respective lower downstream jaw mounting brackets 88; and, as shown in FIG. 6, distal ends of respective cylinder rods 91 may be connected to respective lower upstream jaw mounting brackets 84. Simultaneous operation of the engagement actuators 90 may cause the lower downstream jaw mounting brackets 88 and respective lower downstream racks 68 to pivot toward the lower upstream jaw mounting brackets 84 and the respective lower upstream racks 62, thereby engaging their respective teeth 66, 64. Reversing the operation of the engagement actuators 90 may cause the lower downstream racks 68 to move simultaneously away from the lower upstream racks 62, thereby disengaging their respective teeth 66, 64.

Figure 9:
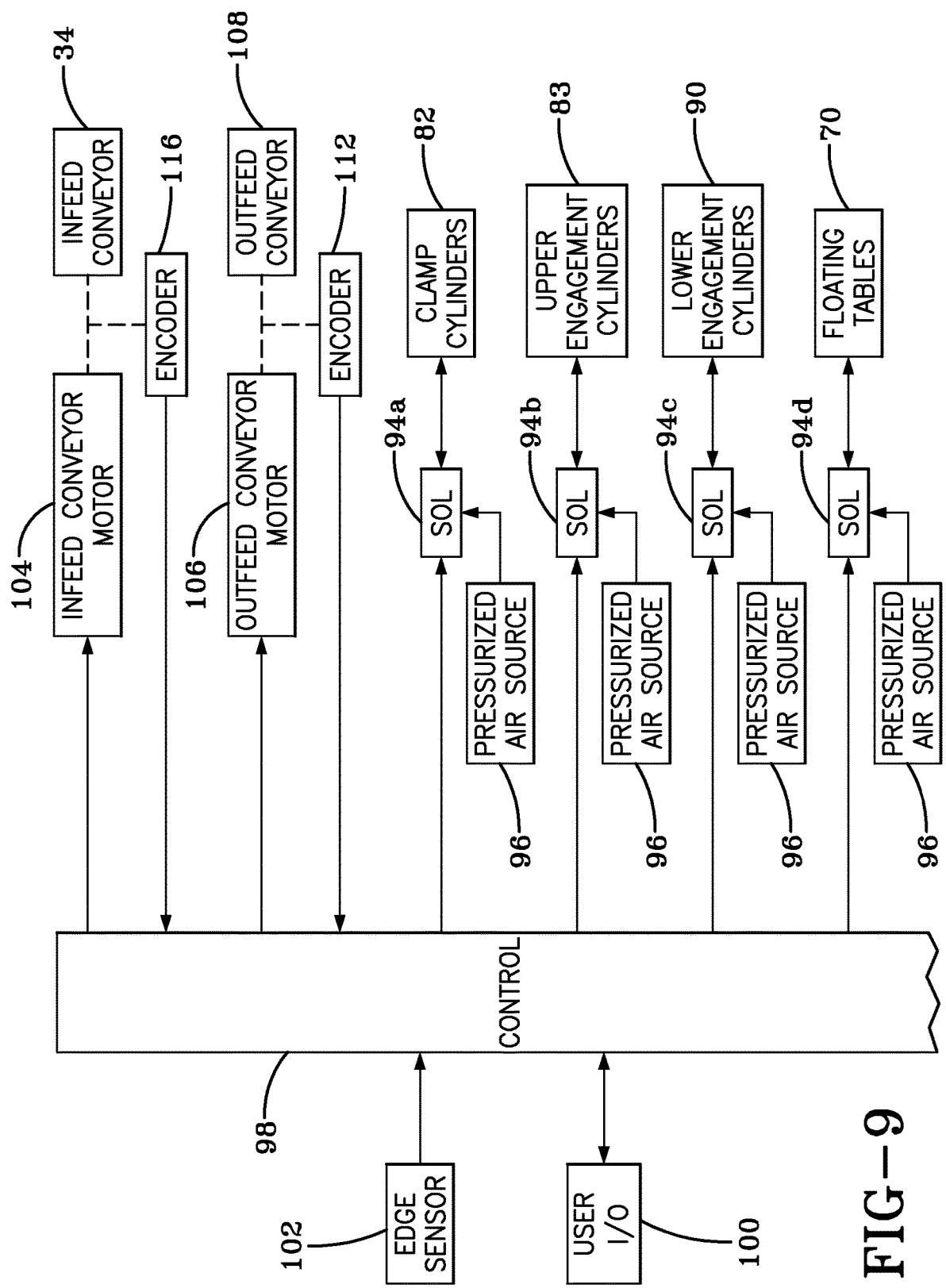
FIG. 9 is a schematic block diagram of part of a control system used to control the operation of the butt splicer and gum strip applier of FIG. 4.

Referring to FIG. 9, the operation of the floating table 70 and cylinders 90, 82, 83 may be controlled by the operation of solenoids 94 transferring pressurized air from a source 96. The operational states of the solenoids may be commanded by output signals from a controller 98 (e.g., a programmable logic controller, microcontroller, etc.). The operation of the controller 98 may be controlled by input devices (e.g., a user 1/0 100, an edge sensor 102, etc.) The controller 98 may also provide output signals that command the operation of an infeed conveyor motor 104 (FIG. 2) and an outfeed conveyor motor 106 that operate the respective infeed and outfeed conveyors 34, 108.

The operation of the butt splicer 36 may be controlled by various cycles of operation programmed into the controller 98 as a group of subroutines. For example, a first subroutine (FIG. 7) may position cut pieces 32 in the butt splicer 36 in preparation for making the butt joint. The process of FIG. 5 may start with a preparation ply 38 in the butt splicer 36 and a completed butt joint.

Figure 12:
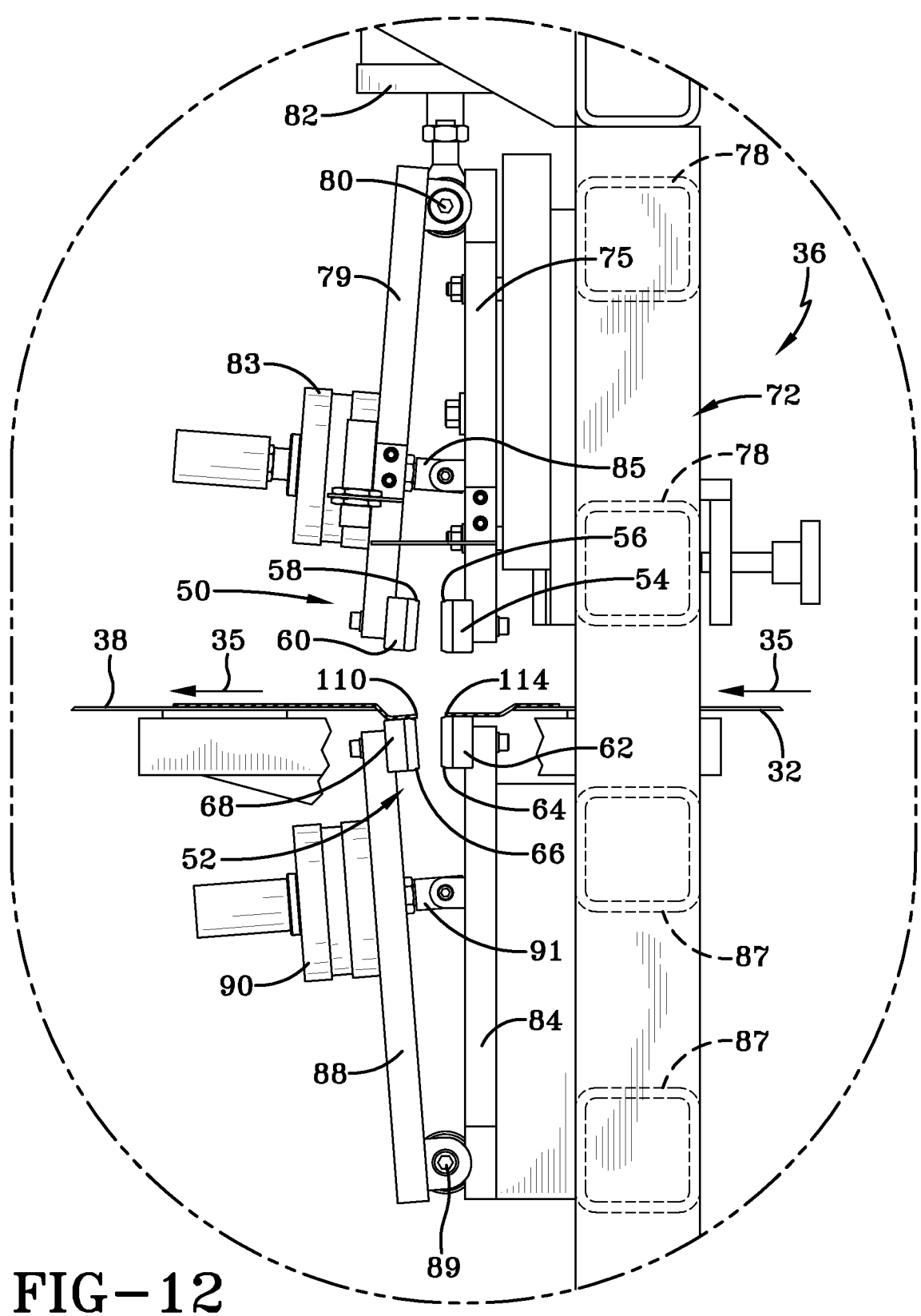
FIG. 12 is an end view illustrating a first condition of a rack on the butt splicer of FIG. 4 in executing the butt splicing cycle of FIG. 9.

Referring to FIGS. 4, 5, 9, and 11, to position the preparation ply 38 and a new cut piece 32 for the next splice, the controller 98 may provide, at 502, output signals to run the infeed and outfeed conveyor motors 104, 106, respectively. Simultaneously, the controller 98 may provide an output signal to the solenoid 94 for adjusting state and transferring pressurized air to the floating tables 70. Thus, material may be moved over the butt splicer 36 with minimal friction from a subjacent support. Simultaneous operation of the infeed and outfeed conveyors 34, 108 may move the preparation ply strip 38 in a downstream direction 35, as viewed in FIGS. 4, 5, and 12. The motion of the preparation ply strip 38 may result in a trailing edge 110 (FIG. 12) passing beneath an edge sensor 102 mounted on the butt splicer 36. Upon detecting the trailing edge 110, the edge sensor 102 may provide an output signal, at 504, to the controller 98.

The controller 98 may monitor the operation of the outfeed conveyor 108 to determine when the trailing edge 110 has been moved to a desired position with respect to the teeth 66 of the lower downstream rack 68. The distance between the point at which the trailing edge 110 is sensed by the edge sensor 102 and the final position of the trailing edge 110 on the lower downstream rack 68 may be a known value. Therefore, the operation of the outfeed conveyor motor 106 may be precisely controlled such that the outfeed conveyor 108 stops when the trailing edge 110 is at its desired location on the lower downstream rack 68. The desired location of the trailing edge 110 may vary depending on the design of the butt splicer 36, the depth of the teeth of the racks, the nature of the preparation ply material 38, etc.

The desired position of the trailing edge 110 may be set back from the front edges of the teeth 66 of the lower downstream rack 68. However, the amount of setback of the trailing edge 110 may be determined experimentally in each application and may, for example, be a distance equal to somewhat less than half the length of the teeth 66. Detecting when the trailing edge 110 is in position may be accomplished in several ways. In one, the outfeed conveyor motor 106 may have an encoder 112 attached thereto with each output pulse from the encoder representing an incremental displacement of the outfeed conveyor 108. Thus, the controller 98 may detect and count output pulses from the encoder 112 and detect, at 506, when the trailing edge 110 is at its desired position on the teeth 66 of the lower downstream rack 68. In another, if the speed of the outfeed conveyor 108 is fixed, the controller 98 may start an internal timer that counts milliseconds required to move the trailing edge 110 from its position under the edge sensor 102 to a desired position on the teeth 66 of the lower downstream rack 68. When the controller 98 determines, at 506, that the trailing edge 110 is at its desired position, the controller may provide, at 508, an "STOP" output signal to the outfeed conveyor motor 106. In addition, the controller 98 may provide an output signal switching the state of solenoid 94 to remove the supply of pressurized air from the downstream floating table 70 thereby providing a more rigid support for the cut piece 38.

Simultaneously with moving of the preparation ply 38, the operation of the infeed conveyor 34 by the controller 98 may also cause a new cut piece 32 to move in the downstream direction 35 toward the butt splicer 36. After detecting the trailing edge 110 of the preparation ply 38, the edge sensor 102 may detect the leading edge 114 of the next cut piece 32 to be spliced to the preparation ply strip 38 with its output changing state, at 510. Upon detecting a change of state, the controller 98 may begin counting pulses from an encoder 116 connected to the infeed conveyor motor 104. By counting encoder pulses, the controller 98 may determine when the leading edge 114 is at a desired position on the teeth 64 of the lower upstream rack 62. Again, the desired position of the leading edge 114 may vary depending on design of the butt splicer 36, the depth of the teeth of the racks, the nature of the preparation ply material, etc. The desired position of the leading edge 114 may be determined in the same way as described above with respect to the desired position of the trailing edge 110.

Upon detecting, at 512, the desired position of the leading edge 114, the controller 98 may provide, at 514, an "STOP" output signal to the infeed conveyor motor 104. The infeed conveyor 34 and the outfeed conveyor 108 may normally have about equal speeds or the outfeed conveyor may run slightly faster than the infeed conveyor to increase the gap between the trailing edge 110 of the preparation ply 38 and the leading edge 114 of the ply section 32.

The controller 98 may also provide an output signal switching the state of solenoid 94 for removing the supply of pressurized air from the upstream floating table 70 and for providing a more rigid support for the cut piece 32. At this point, the edges 110, 114 may be located at desired locations on respective teeth 66, 64 of the lower rear and forward racks 68, 62.

Figure 16:
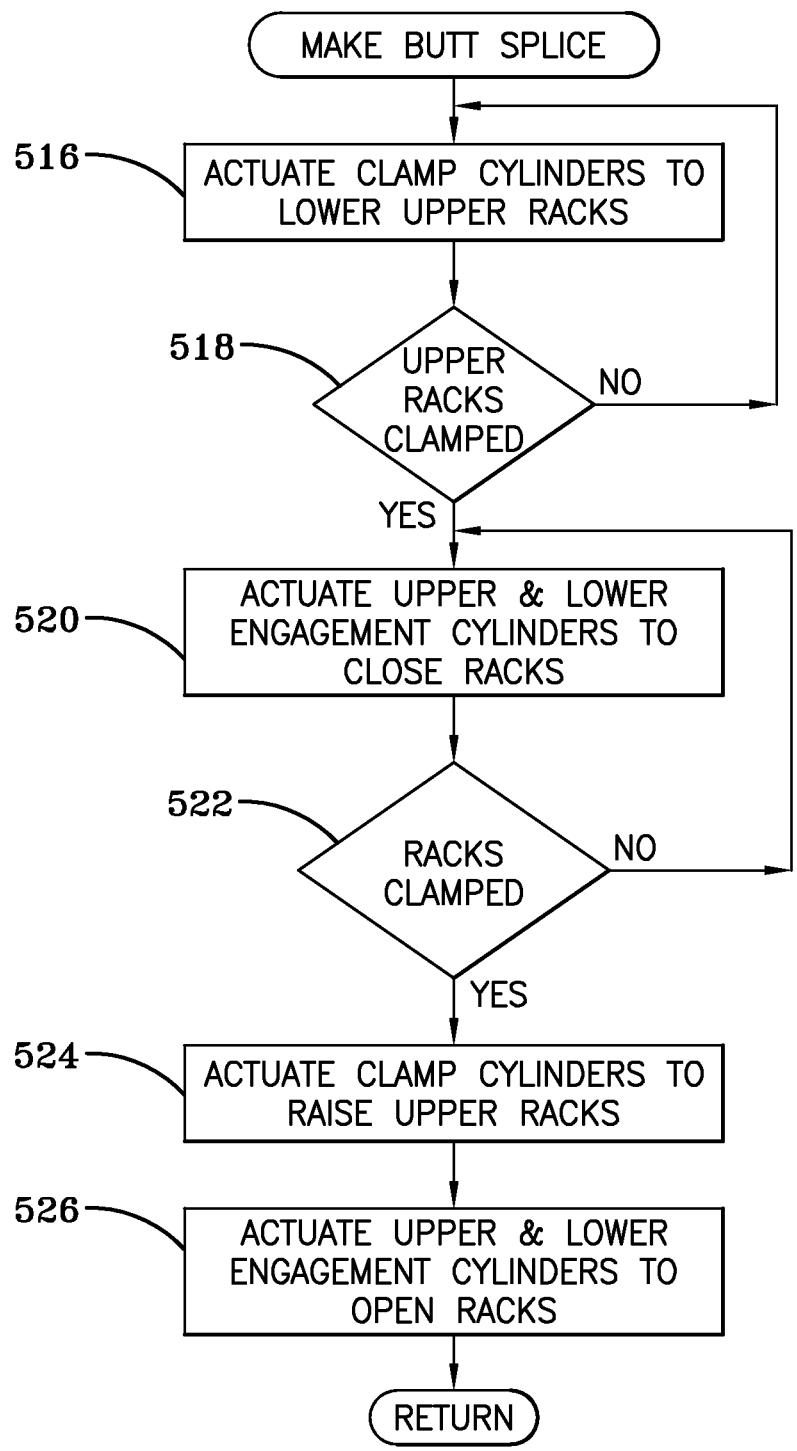
FIG. 16 is a flowchart of a subroutine implemented by the control system of FIG. 9 for butt splicing the preparation ply materials.

After the edges 110, 114 are at the desired locations, the butt splicer 36 may form a butt splice joining the preparation ply strip 38 with the new cut piece 32. Referring to FIG. 16, a process for making a butt splice may begin with the controller 98 providing, at 516, an output signal to the solenoid 94 causing the solenoid to switch states and port pressurized air to the clamp cylinders 82. The clamp cylinders 82 may simultaneously lower the plurality of upper racks 50 until the upper downstream racks 60 contact a portion of the preparation ply strip 39 adjacent the trailing edge 110 being supported by respective lower downstream racks 68.

Figure 13:
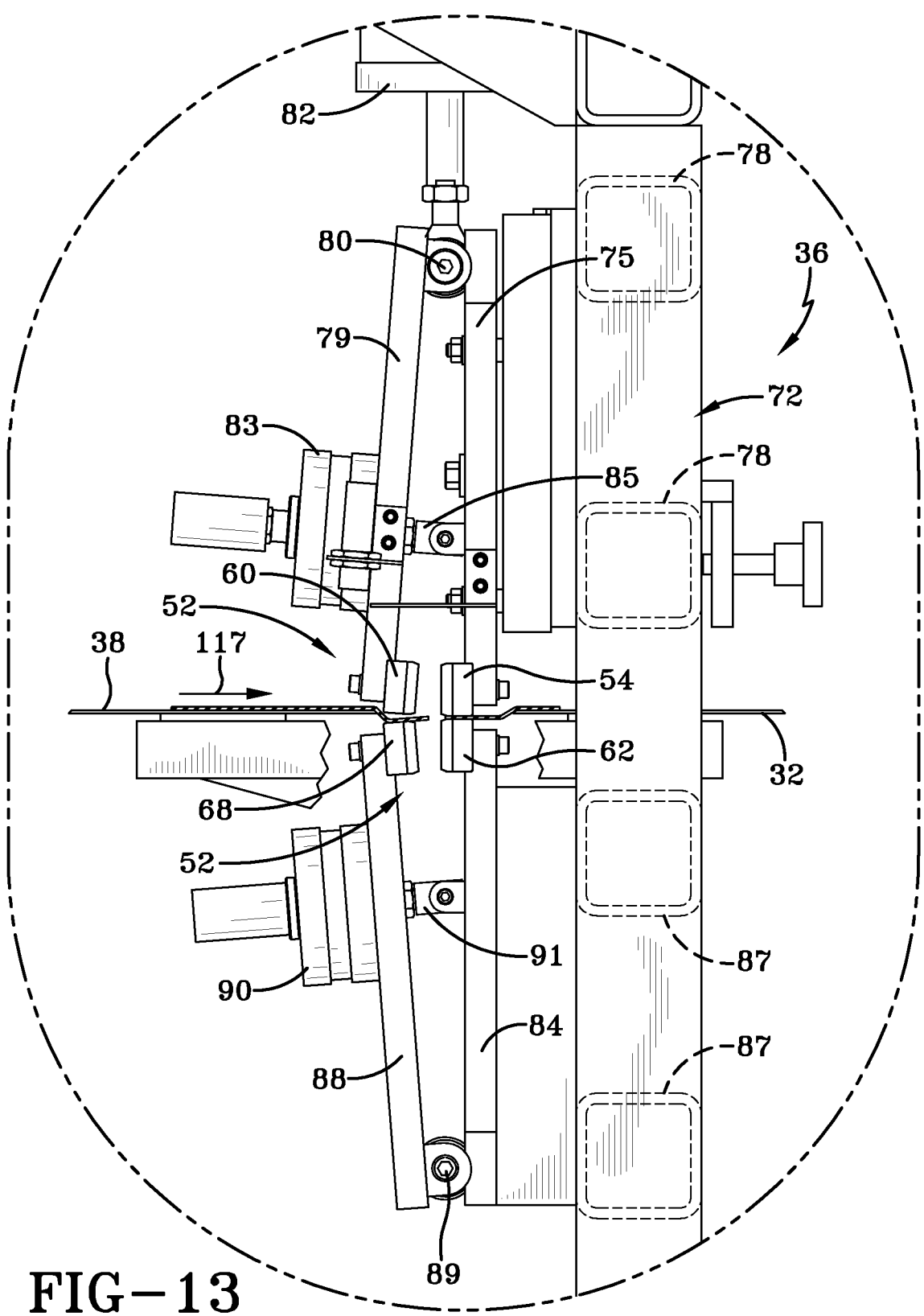
FIG. 13 is an end view illustrating a second condition of a rack on the butt splicer of FIG. 4 in executing the butt splicing cycle of FIG. 9.

Simultaneously, the upper upstream racks 54 may contact a portion of the cut strip 32 adjacent the leading edge 114 supported by the lower upstream racks 62, as shown in FIG. 13. The time required to move the upper racks 54 to their clamped position may be measured and the controller 98 may initiate an internal timer equal to that clamping operation time. Therefore, when that time expires, the controller 98 may then determine, at 518, the upper pairs of racks 50 have been moved to their respective clamped positions.

Figure 14:
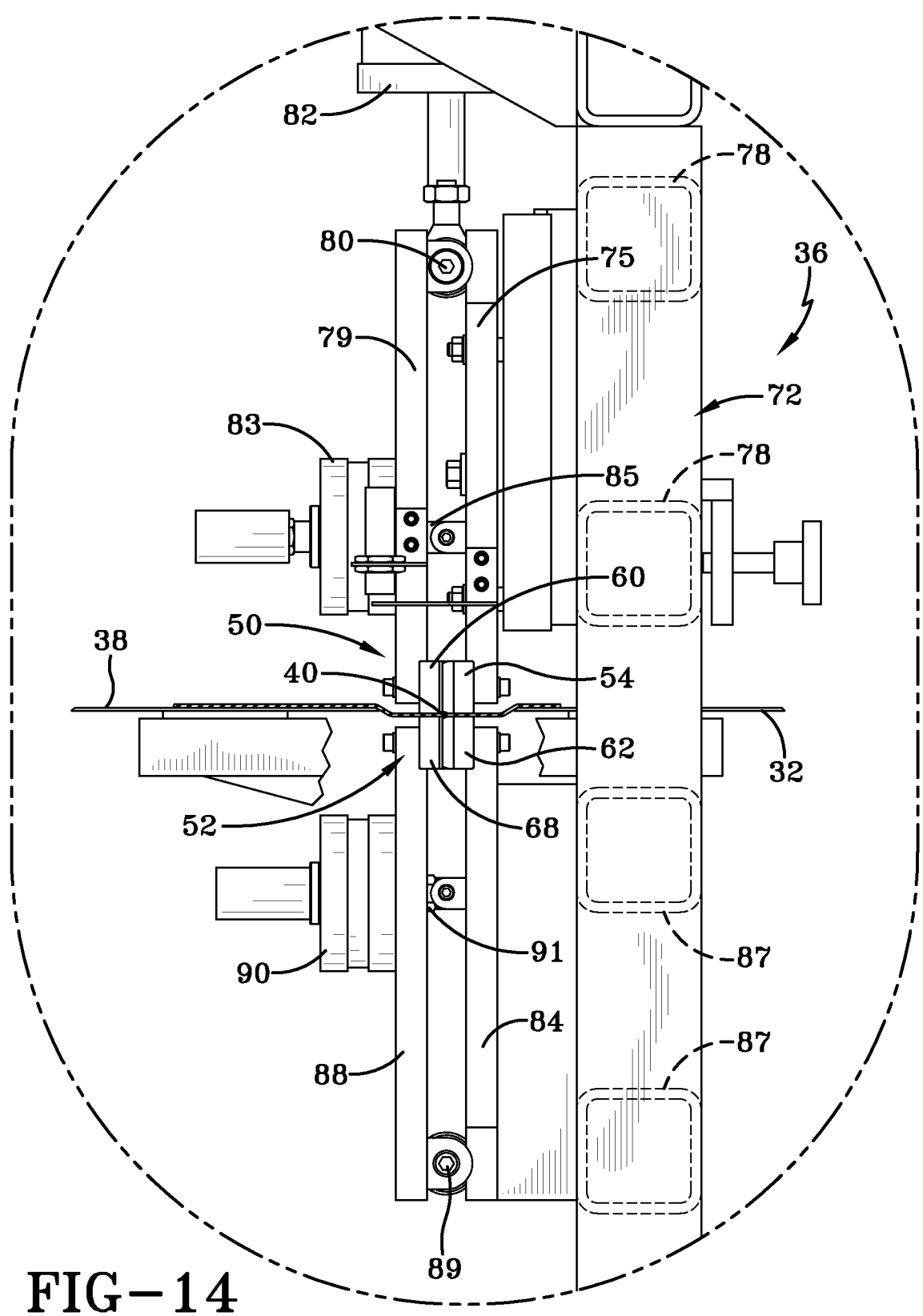
FIG. 14 is an end view illustrating a third condition of a rack on the butt splicer of FIG. 4 in executing the butt splicing cycle of FIG. 9.

Thereafter, the controller 98 may then provide, at 520, output signals to the solenoids 94b, 94c changing the states of those solenoids and porting pressurized air into the upper and lower engagement cylinders 83, 90, respectively. The engagement cylinders 83, 90 may move the upper and lower downstream racks 60, 68 toward their corresponding mating upper and lower upstream racks 54, 62. The clamped upper and lower downstream racks 60, 68 may move the preparation ply 38 in an upstream direction 117 (FIG. 13) to bring the preparation ply strip trailing edge 110 into contact with the cut piece leading edge 114 in an abutting relationship. Continued motion of the upper and lower downstream racks 60, 68 may firmly force the preparation ply strip trailing edge 110 against the cut piece leading edge 114 to form the butt splice 40 (FIG. 14). The tackiness of the elastomeric material may maintain the cut piece leading edge 114 in contact with the preparation ply strip trailing edge 110. That motion may continue until the teeth 58, 66 of the respective upper and lower downstream racks 60, 68 are fully engaged with the teeth 56, 64 of the respective upper and lower upstream racks 54, 62, as shown in FIG. 14.

Figure 15:
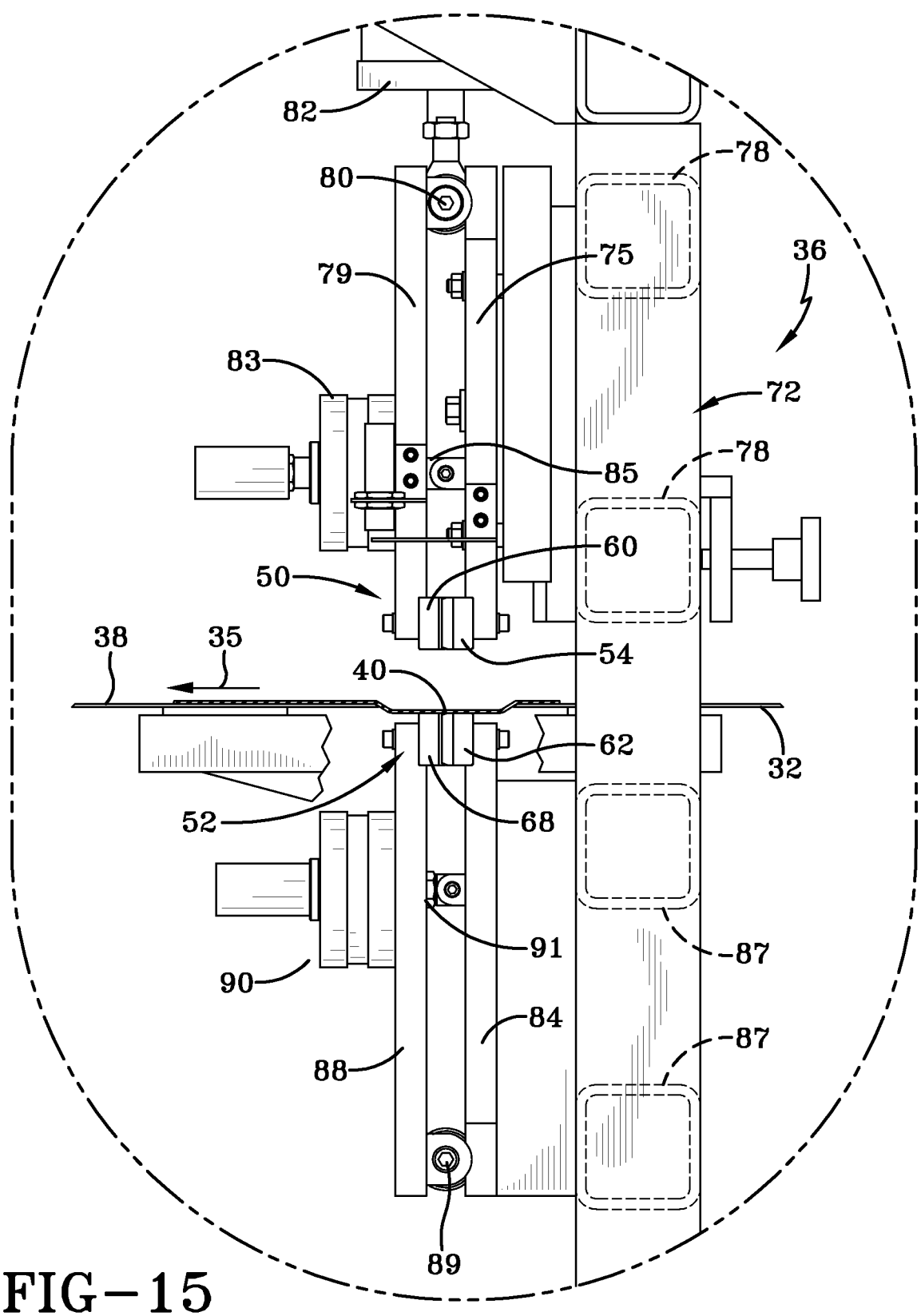
FIG. 15 is an end view illustrating a fourth condition of a rack on the butt splicer of FIG. 4 in executing the butt splicing cycle of FIG. 9.

As previously described, the controller 98 may determine, at 522, the upper and lower downstream racks 60, 68 are fully engaged with respective upper and lower upstream racks 54, 62. The controller 98 may then provide, at 524, an output signal to switch the state of solenoid 94a thereby reversing the porting of pressurized air to the clamp cylinders 82. The actuation of the clamp cylinders 82 may cause the pairs of upper racks 50 raise and move back to an undamped position, as shown in FIG. 15. Immediately thereafter, the controller 98 may provide, at 526, output signals to the solenoids 94b, 94c to switch the states of the upper and lower engagement cylinders 83, 90 thereby moving the upper and lower downstream racks 60, 68 in the downstream direction 35 away from the upper and lower upstream racks 54, 62. This operation may cause the racks to open to the position illustrated in FIG. 12.

As the upper and lower downstream racks 60, 68 move toward the respective upstream racks 54, 62, the downstream racks 60, 68 and the preparation ply 38 may move simultaneously. However, after the preparation ply trailing edge 110 contacts the cut piece leading edge 114, the upper and lower downstream racks 60, 68 may have a relative motion with respect to the preparation ply strip 38 and therefore must slide over the major surfaces of the preparation ply strip 38 without causing damage. The sides 93 of the pivoting downstream racks 60, 68 may be coated with a polytetrafluoride (PTFE) material. In addition, the teeth of the upper and lower downstream racks 60, 68 may be beveled at their leading edges of contact, that is, the surface 92 (FIG. 7). The configuration of the beveled surface 92 may be application dependent and vary with the nature of the ply material, the length of the racks, etc. The beveled surface 92 may have an angle of about 10° with respect to the side surface 93 of the rack or an angle of about 20°. An angle providing optimum performance may be determined experimentally. Similarly, the desired length of the beveled surface 92 and the desired depth from the side surface 93 may also be determined experimentally. Such a beveled surface 92 may facilitate sliding motion of the downstream racks 60, 68 over the preparation ply strip 38 without gouging or otherwise causing damage.

Figure 17:
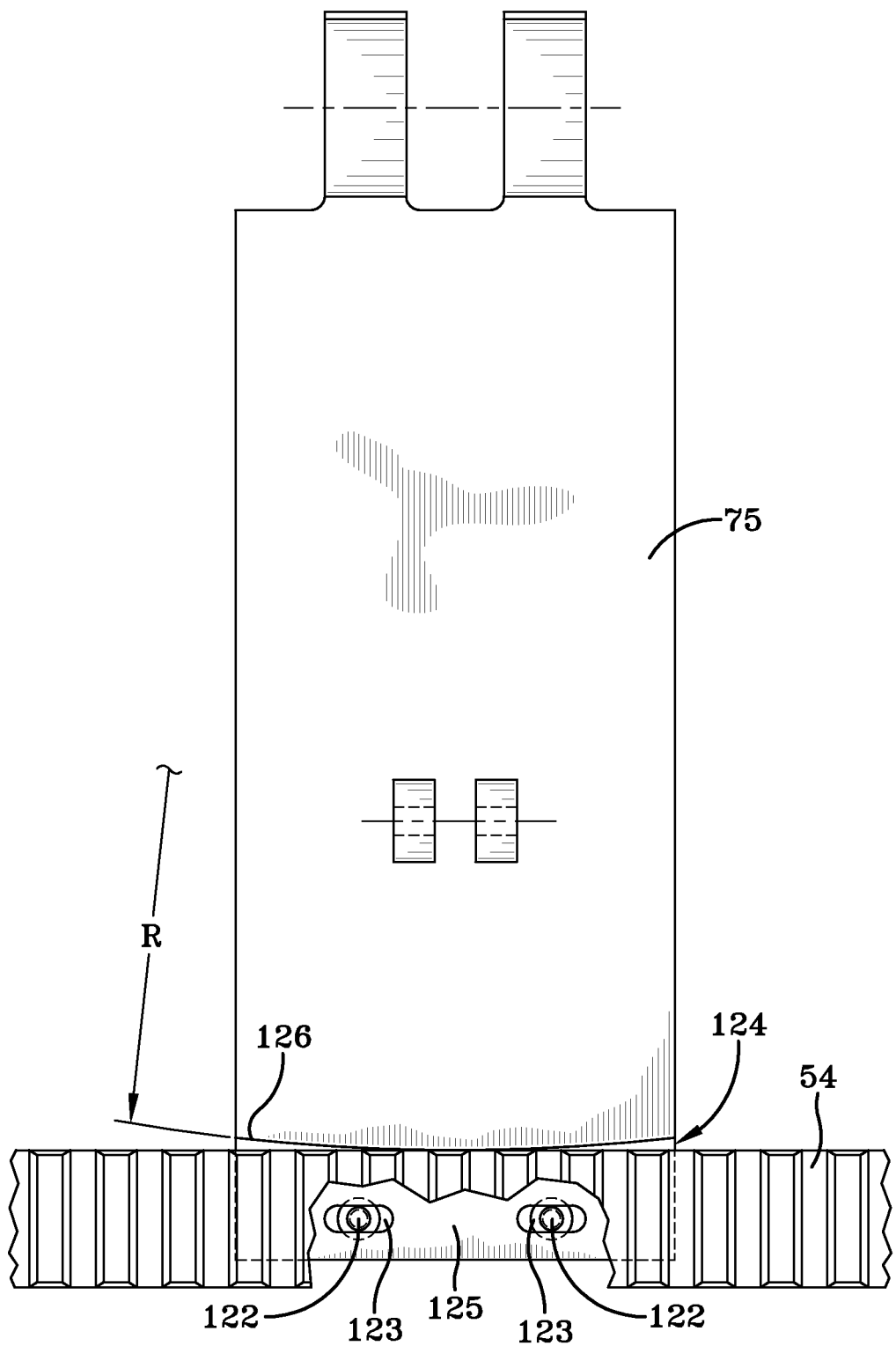
FIG. 17 illustrates how the upper pairs of racks are non-rigidly mounted in jaw mounting brackets on the butt splicer of FIG. 5.

The butt splicer 36 may have a plurality of pairs of upper and lower racks 50, 52 for a more consistent, higher quality butt splice than if the upper and lower racks 50, 52 extend continuously across a full width of the butt splicer 36. Reliability and quality of the butt splice may be further improved by nonrigidly mounting the upper racks 54, 60 to respective upper jaw mounting brackets 75, 79. The nonrigid mounting of the racks 54, 60 may be identical; and the mounting of rack 54 onto a jaw mounting bracket 75 is shown in FIG. 17. Shoulder bolts 122 may extend through slots 123 in the jaw mounting bracket 75 and threadedly engage the rack 54. Thus, the rack 54 may be nonrigidly mounted to the respective jaw mounting bracket 75, but also be free to move relative thereto by an amount depending on the size of the slots 123. Further, the end of the jaw mounting bracket 75 may have a generally L-shaped notch 124 extending across a width of the jaw mounting bracket 75. The slots 123 may intersect a first notch surface 125 that contacts a rear surface of the rack 54. A perpendicular surface 126 of the notch 124 may be curved (e.g., a 30 inch radius) to allow the rack 54 to rock thereon. Such nonrigid mounting of the upper racks 54, 60 to respective jaw mounting brackets 75, 79 may substantially improve the quality of the butt splice 40.

The operation of the butt splicer 36 may provide reliable and high quality butt joints in the formation of a preparation ply strip. Further, the butt splicer 36 may form butt splices that are substantially perpendicular to the infeed conveyor 34, as well as butt splices that are oblique with, or angled slightly from, a line perpendicular to the infeed conveyor. Referring to FIG. 6, a forward leg 131 of the frame 72 of the butt splicer 36 may be pivotally mounted to a base plate 132. A rearward leg (not shown) of the frame 72 may be supported by a caster 133 that rides on the base plate 132. A ball screw and nut assembly 134 may connect the rearward leg and a handwheel 135. Turning the handwheel 135 may rotate the ball screw and cause the nut, pivotally attached to the rearward leg of the frame 72, to travel along the ball screw. As the nut moves, the rearward leg of the frame 72 may pivot with respect to the forward leg 131 thereby skewing the rows of upper and lower racks 50, 52 with respect to a line perpendicular to a longitudinal centerline of the infeed conveyor 34. An indicator associated with the handwheel 135 may be calibrated in one degree increments. Permitting the frame 72 to pivot through an angle of up to about 10 degrees may be sufficient for most applications.

The butt joint may be stronger and more stable during the tire manufacturing process if it is covered with a gum strip laid perpendicularly across the butt joint. For an efficient operation, the gum strip applier 44 may operate simultaneously with the butt splicer 36. Therefore, the gum strip applier 44 may be positioned, with respect to the butt splicer 36, such that, simultaneously with the preparation ply trailing edge being positioned at the butt splicer 36, the most recently formed butt splice may be positioned at a location suitable for a gum strip to be applied by the gum strip applier 44.

Figure 18:
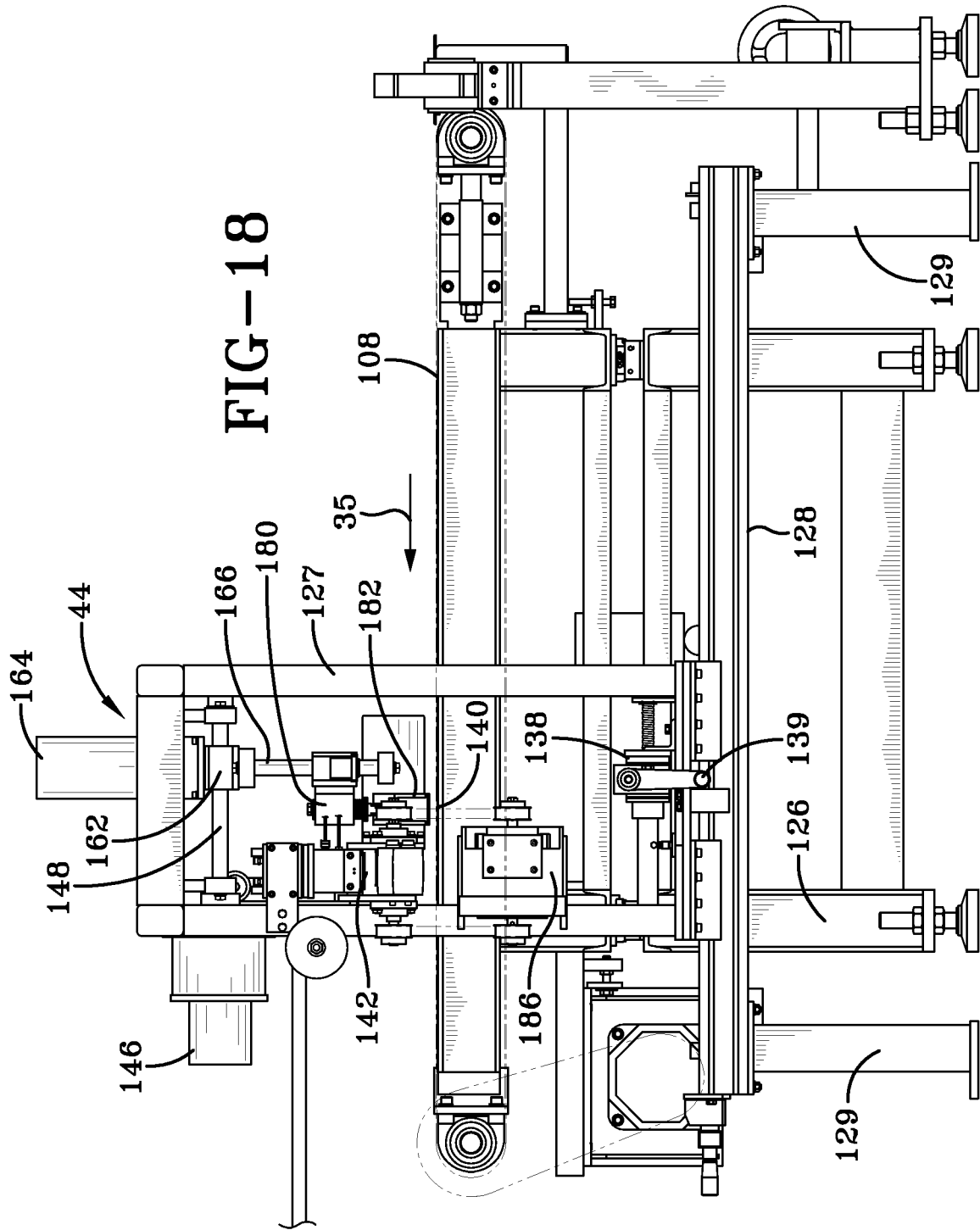
FIG. 18 is an end view of the gum applier of FIG. 5.
Figure 19:
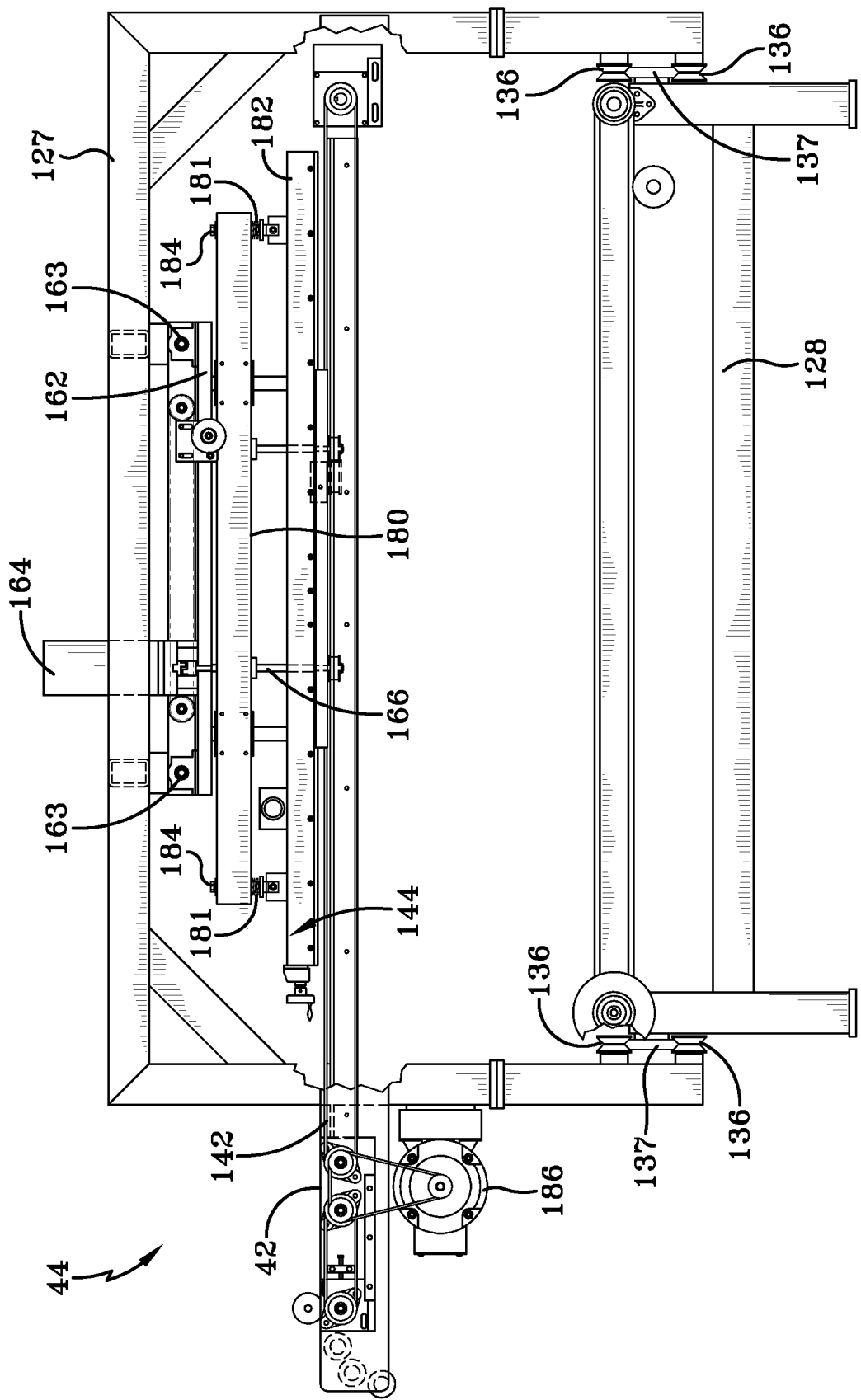
FIG. 19 is a side view of the gum applier of FIG. 5.

Referring to FIG. 18, the outfeed conveyor 108 may be supported by a base 126. The gum strip applier 44 may have a frame 127 independently supported by a base 128 and legs 129. Thus, the outfeed conveyor 108 and gum strip applier 44 may be positioned independently with respect to the butt splicer 36. The gum strip applier 44 may be positioned such that when a butt splice is formed on the butt splicer 36, a previously made butt splice may be located on the outfeed conveyor 108 at a location 140 permitting the gum strip applier 44 to apply a gum strip to the previously made butt splice. Referring to FIG. 19, the gum strip applier 44 may have a gum strip conveyor 142 and a vacuum head assembly 144. The vacuum head assembly 144 may have two degrees of freedom permitting removal of a gum strip from the strip conveyor 142 and placement a butt splice positioned at the upstream location 140.

Figure 20:
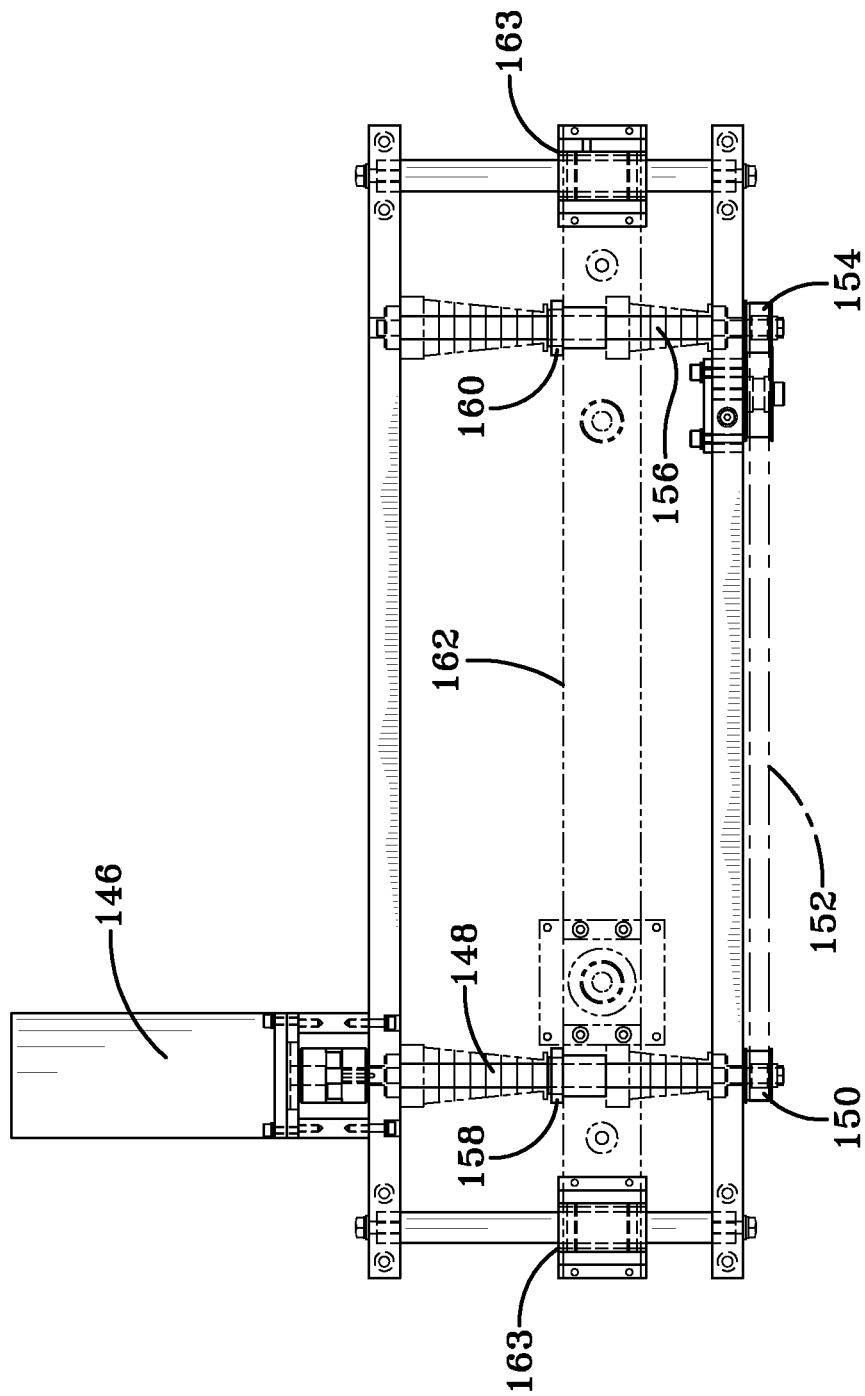
FIG. 20 is a partial top view of the gum applier of FIG. 5 illustrating horizontal drive components.

Referring to FIG. 20, an X-axis horizontal drive motor 146 may be mechanically connected to one end of a ball screw 148; and a sprocket 150 may be mounted on an opposite end of the ball screw 148 for operatively engaging a timing belt 152. The timing belt 152 may be further connected to a second sprocket 154 mounted on an end of a second ball screw 156. The ball screws 148, 156 may have respective ball nuts 158, 160 that support and carry a carriage 162 supported and guided in linear motion by linear bearings 163. As shown in FIG. 20, the carriage 162 may support the vacuum head assembly 144. The vacuum head assembly 144 may have a length substantially equal to the length of the butt splice (e.g., the full width of the preparation ply strip). Rotation of the horizontal drive motor 146 may simultaneously move the ball nuts 158, 160 (FIG. 20), the carriage 162, and the vacuum head assembly 144 in a horizontal direction substantially parallel to a longitudinal axis of the preparation ply strip.

Figure 21:
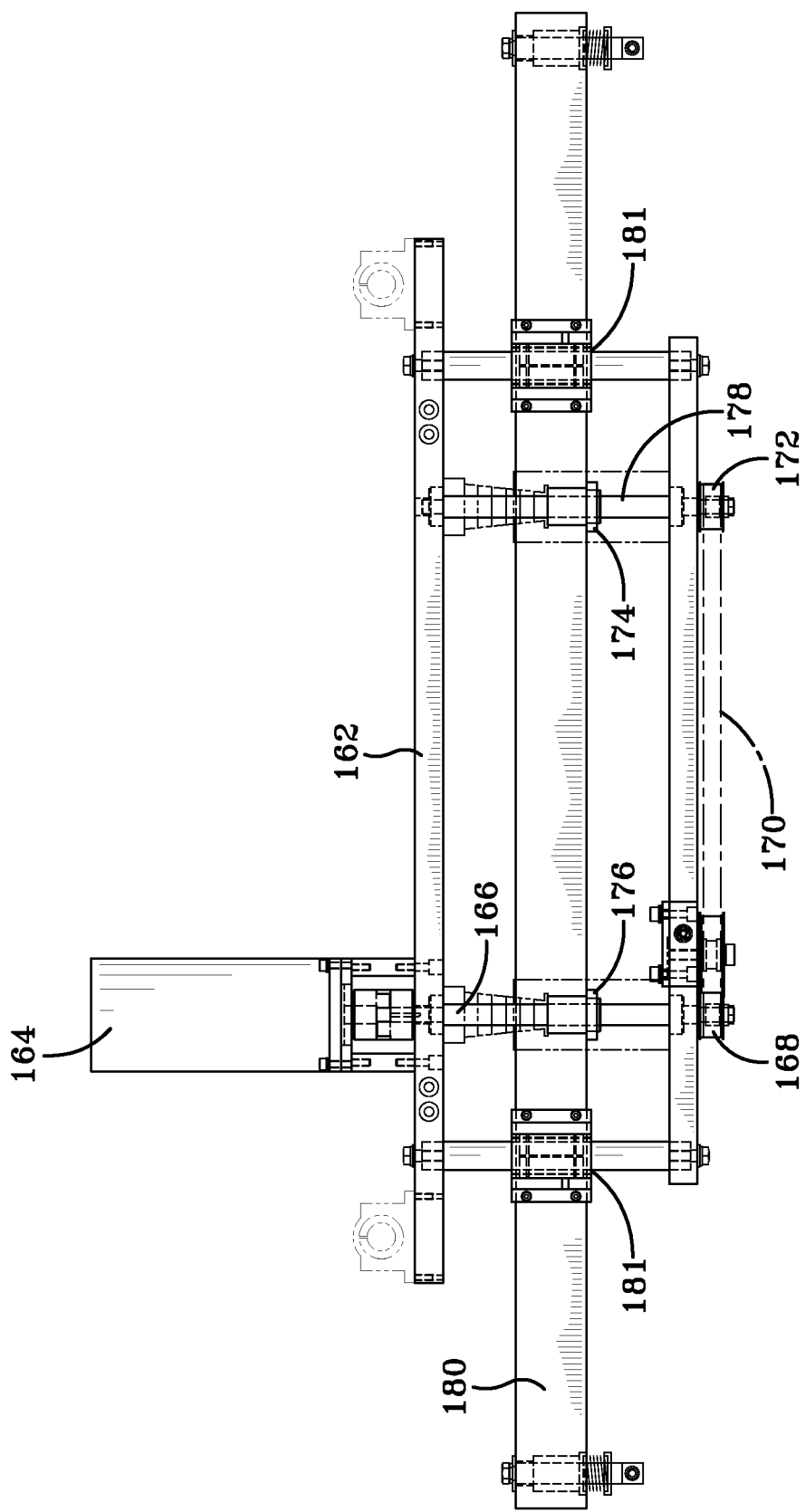
FIG. 21 is a partial end view of the gum applier of FIG. 5 illustrating vertical drive components.

Referring to FIG. 21, a Z-axis vertical drive motor 164 may be mounted on, and supported by, the carriage 162 and may be mechanically connected to one end of a first ball screw 166. A first timing sprocket 168 may be mounted on an opposite end of the first ball screw 166 and operatively engage a timing belt 170 that also engages a sprocket 172 mounted on an end of a second ball screw 174. First and second ball nuts 176, 178 may be rotatably mounted on the respective ball screws 166, 178 and connected to a vacuum head plenum 180, which is guided in linear motion by linear bearings 181.

Referring to FIG. 19, a vacuum head 182 may be supported by vertical posts 184 fixed to the plenum 180. Biasing components, such as compression springs 181, may be mounted on the posts 184 between the vacuum head 182 and the plenum 180. The vacuum head 182 may have a length extending across substantially the entire width of the outfeed conveyor 108, as well as the length of a butt splice in the preparation ply strip. Thus, operation of the vertical drive motor 164 may raise the vacuum plenum 180 and the vacuum head 182 below the outfeed conveyor 108.

Figure 10:
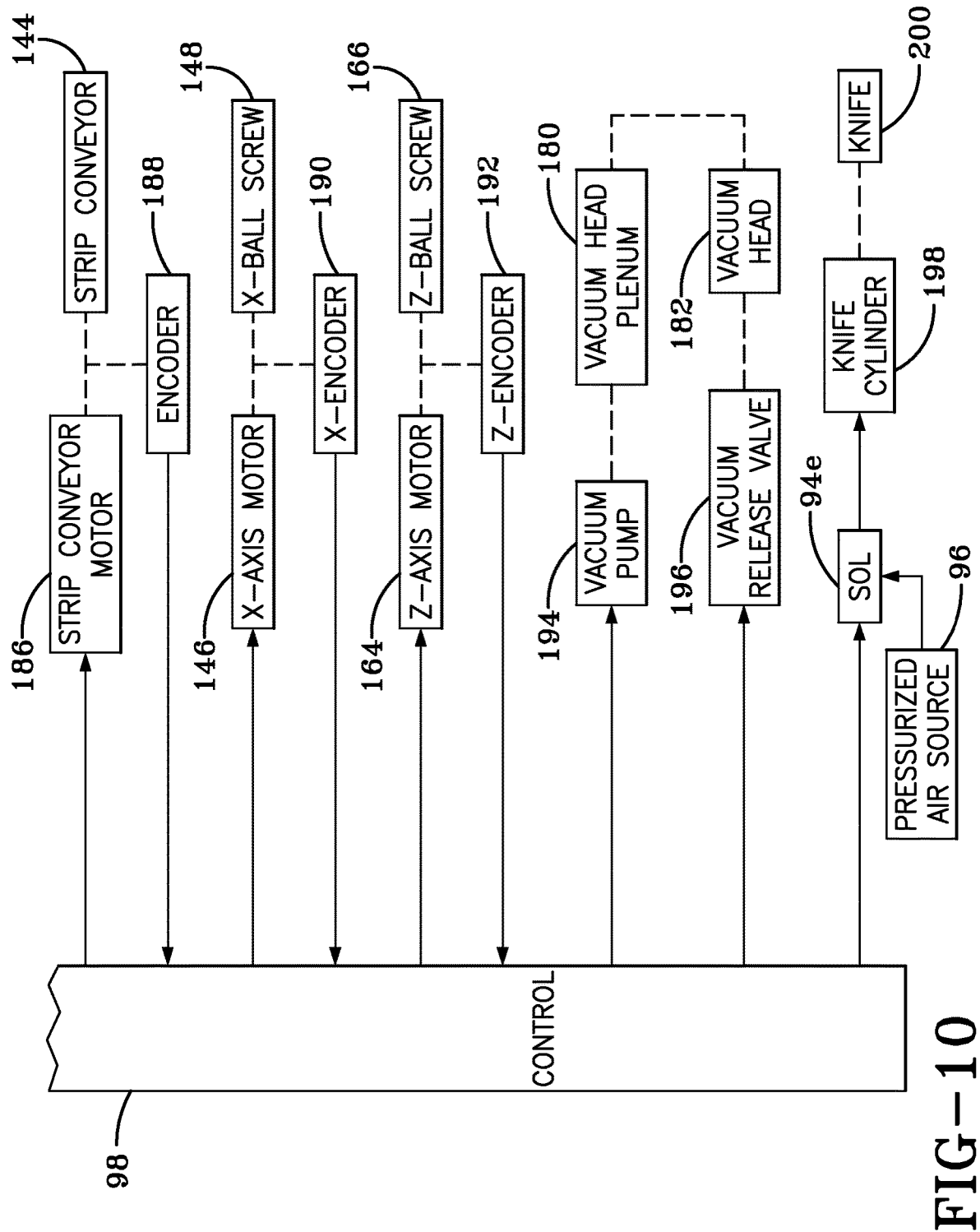
FIG. 10 is a schematic block diagram of another part of a control system used to control the operation of the butt splicer and gum strip applier of FIG. 4.
Figure 11:
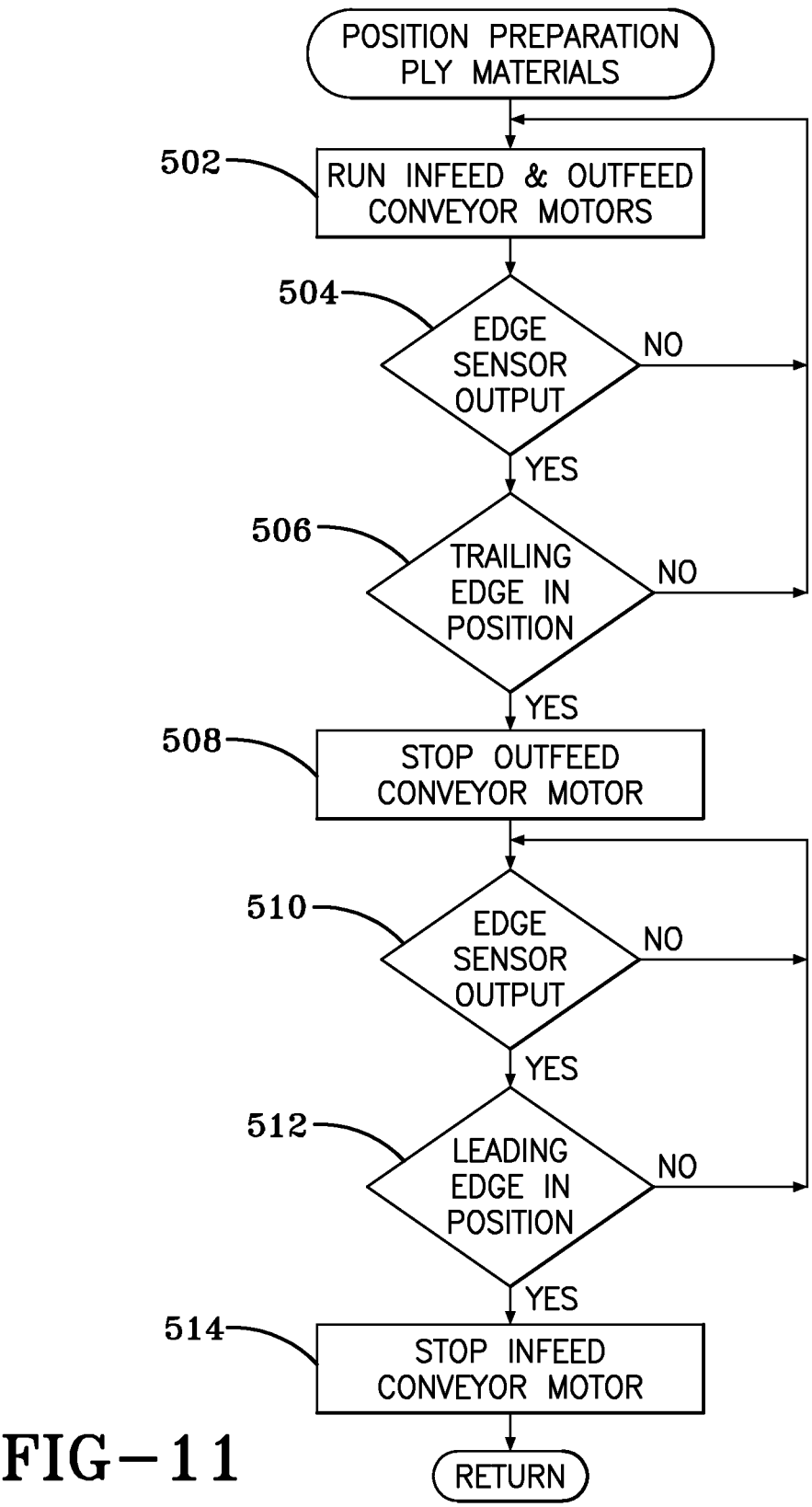
FIG. 11 is a flowchart of a subroutine implemented by the control system of FIG. 9 for positioning a preparation ply piece prior to a butt splicing cycle.

Referring to FIG. 10, the controller 98 may provide output signals to the strip conveyor motor 186 and receive input pulses from a strip conveyor encoder 188 by which the controller 98 may determine the linear motion of the strip conveyor 142. Similarly, in response to output signals commanding the horizontal and vertical drive motors 146, 164, the controller 98 may receive feedback signals from the encoders 190, 192 representing motion of the vacuum head 182. The controller 98 may also operatively connect to a vacuum pump 194 that applies partial vacuum pressure to the plenum 180. A vacuum may be applied and released by the vacuum head 182 by means of a vacuum release valve 196 connecting the vacuum head plenum 180 and the vacuum head 182. When in its first state, the valve 196 may close the vacuum head 182 to atmosphere and open it to the 180 thereby applying a partial vacuum to the vacuum head 182. In its opposite second state, the valve 196 may close the connection between the vacuum head 182 and the plenum 180 and open the vacuum head to atmosphere thereby dissipating the partial vacuum therein. The controller 98 may also connect to a solenoid 94e for changing the state of a knife cylinder 198 thereby operating a knife 200 on the gum strip preparation equipment 48 (FIG. 5) to cut the gum strips to desired lengths.

Figure 22:
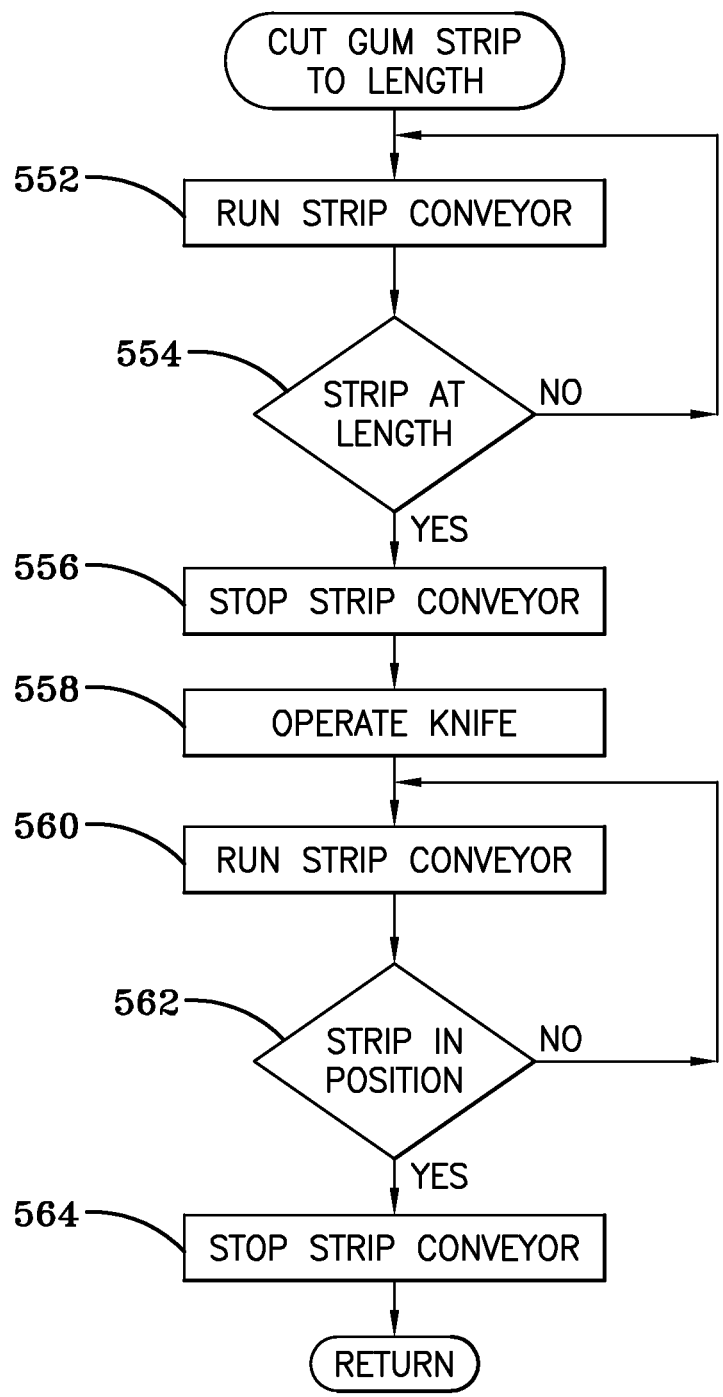
FIG. 22 is a flowchart of a subroutine implemented by the control system of FIG. 9 for cutting a gum strip to length.

There may be three independent, but coordinated, operations or subroutines executed by the gum strip applier 44. Referring to FIG. 19, first a gum strip 42 may be moved by the conveyor 142 to a location ready for transfer to the vacuum head 182. A second operation allows the vacuum head 182 to pick up the gum strip from the conveyor 142 and be ready to apply the gum strip to the butt joint. A third operation may apply the gum strip to the butt joint after the butt joint has been moved to the desired location 140 (FIG. 18). Referring to FIGS. 10, 19, and 22, to cut a gum strip to length, the controller 98 may provide, at 552, an output signal to operate the strip conveyor motor 186 thereby causing the strip conveyor 142 to feed the gum strip.

As the gum strip 42 feeds, the controller 98 may monitor and count output pulses from the strip conveyor encoder 188. When the controller 98 counts, at 554, a number of pulses equal to the desired length of the gum strip, the controller may provide, at 556, a "STOP" output signal to the strip conveyor motor 186. Thereafter, the controller 98 may provide, at 558, an output signal commanding the solenoid 94e to change state thereby porting pressurized air to the knife cylinder 198 and operating the knife 200. Immediately thereafter, an output signal from the controller 98 may change state thereby reversing the state of solenoid 94e and returning the knife cylinder 198 to its initial position. Operation of the knife cylinder 198 may reciprocate the knife 200 and establish a cut end for the gum strip 145. This action may provide a gum strip on the strip conveyor 142 that is of the desired length (e.g., the length of the butt strip 40).

Thereafter, the controller 98 may provide, at 560, a "START" output signal to the strip conveyor motor 186; and the strip conveyor 142 may transport the gum strip 42 across the width of the outfeed conveyor 108. Again, the controller 98 may monitor and count output pulses from the strip conveyor encoder 188 and determine when the cut gum strip is in its desired position. When that position is detected, at 562, the controller 98 may provide, at 564, a "STOP" output signal to the strip conveyor motor 186. At this point, a gum strip 42 of desired length may be located on the strip conveyor 142 at a location ready to be picked up by the vacuum head 182.

Figure 23:
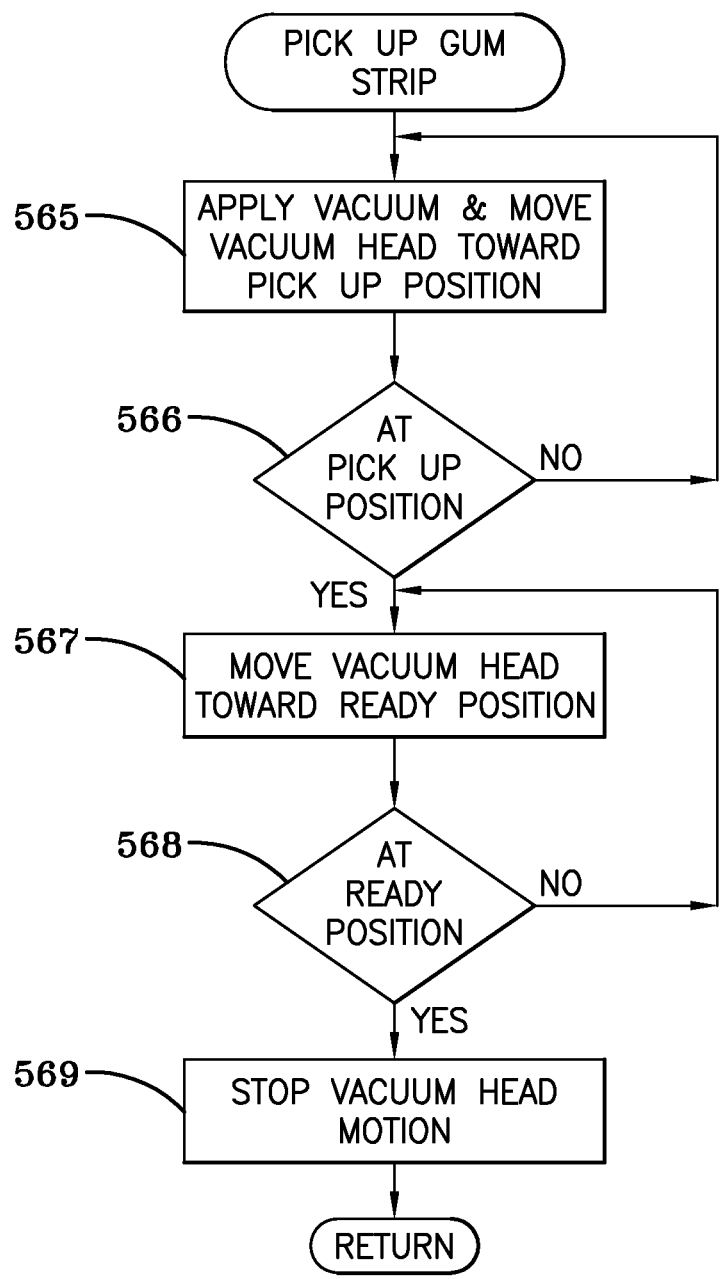
FIG. 23 is a flowchart of a subroutine implemented by the control system of FIG. 9 for picking up a gum strip with a vacuum head.
Figure 24:
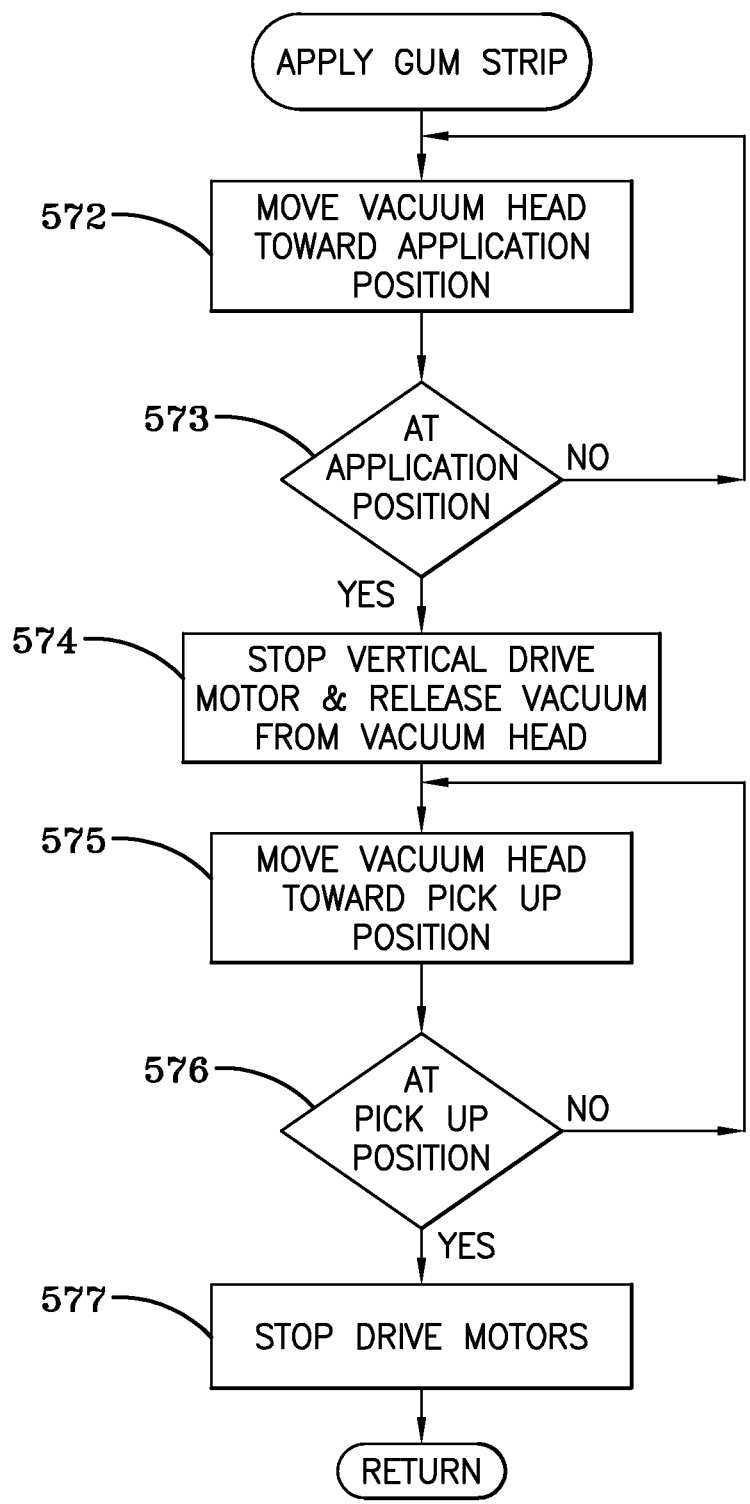
FIG. 24 is a flowchart of another subroutine implemented by the control system of FIG. 9 for applying a gum strip with a vacuum head.

Referring to FIGS. 10, 18, and 23, to pick up the gum strip from the gum strip conveyor 142, the vacuum head 182 may elevated and the carriage 162 may be positioned to locate the vacuum head 182 at a downstream location above the gum strip conveyor 142 ready to pick up a gum strip. The controller 98 may provide, at 565, an output signal to the vacuum release valve 196 closing the vacuum head 182 to atmosphere and opening the vacuum head to the plenum 180. A vacuum may then be applied to the vacuum head 182. The controller 98 may also provide, at 565, output signals to the Z-axis vertical drive motor 164 thereby rotating the ball screws 166, 174 in a direction to move the vacuum head 182 vertically downward toward the gum strip conveyor 142. The controller 98 may monitor and count output pulses from the vertical drive encoder 192 and detect, at 566, when the vacuum head 182 is at its desired position immediately above the strip conveyor 142. At that position, the vacuum head 182 may be sufficiently close to the strip conveyor 142 such that the vacuum head 182 may lift the gum strip off the gum strip conveyor 142.

The controller 98 may then provide, at 567, output signals to the Z-axis vertical drive motor 164 and the X-axis horizontal drive motor 146 causing the vacuum head 182 to move to a ready position immediately above the location 140 at which the butt joint is located. The controller 98 may be programmed to first operate the vertical drive motor 164 to raise the vacuum head 182 and thereafter operate the horizontal drive motor 146 to move the vacuum head horizontally to a ready position over the butt joint location 140. Alternatively, in other applications, the motors 146, 164 may operate simultaneously to move the vacuum head 182 to a ready position.

The controller 98 may monitor output pulses from the encoders 190, 192 in the manner previously described to detect, at 568, which the vacuum head 182 is at the ready position. Thereafter, the controller 98 may provide, at 569, output signals to either or both the motors 146, 164 commanding them to stop the vacuum head 182 at the ready position.

Referring to FIGS. 10, 18, 19, and 24, to apply the gum strip to the butt joint, a butt joint may be moved to the location 140 beneath the vacuum head 182 at the ready position. The controller 98 may provide, at 572, output signals to the Z-axis vertical drive motor 166 rotating ball screws 166, 174 in a direction causing the vacuum head 182 to lower onto, and contact the preparation ply strip 38. The gum strip may have a length extending over substantially the entire length of the butt splice. Further, the gum strip may have a width extending across the butt splice 40 and over a portion of the major surfaces on both sides of the butt splice. The vacuum head 182 may be resiliently and movably mounted to the vacuum head plenum 180. Therefore, as the vertical drive motor 164 continues to move the plenum 182 downward, the vacuum head 182 may contact the preparation ply strip 38 and the springs 181 may apply a downward biasing force against the vacuum head 182 thereby applying a desired application force against the gum strip 42. That force may be determined by spring constants of the springs 181 and may be effective to cause adhesive on the gum strip 42 to better adhere to the preparation ply strip 38.

Again, the controller 98 may monitor the output pulses from the encoder 190 and detect, at 573, when the vacuum head 182 has been moved to its lowermost position. Thereafter, the controller 98 may provide, at 574, a "STOP" output signal to the vertical drive motor 164. In addition, the controller 98 may provide an output signal to the vacuum release valve 196 changing the state of the valve such that the fluid connection between the vacuum head plenum 180 and the vacuum head 182 is blocked and the vacuum head 182 is open to atmosphere. At this point, the controller 98 may allow the vacuum head 182 to remain at its lowermost position and allow the adhesive on the gum strip to set. Such a time may be determined by an internal timer in the controller 98 and may be set from zero to any desired number of seconds.

Thereafter, the controller 98 may provide, at 575, output signals commanding the drive motors 146, 162 to move the vacuum head 182 back to the pickup position above the gum strip conveyor 142. As described above, the controller 98 may monitor the encoders 190, 192 to detect, at 576, when the vacuum head 182 is at the pickup position; and thereafter, at 577, the controller may provide "STOP" output signals to the drive motors 146, 164.

As described above, it may be desirable that the gum strip applier 44 operate simultaneously with the butt splicer 36 to apply the gum strip 42 over the most recently formed butt splice 40 while the butt splicer is splicing the next cut piece 32 to the preparation ply strip 38. Therefore, prior to a butt splice 40 being moved to the position 140, the gum strip applier 44 may prepare a gum strip 42 for application.

Figure 25:
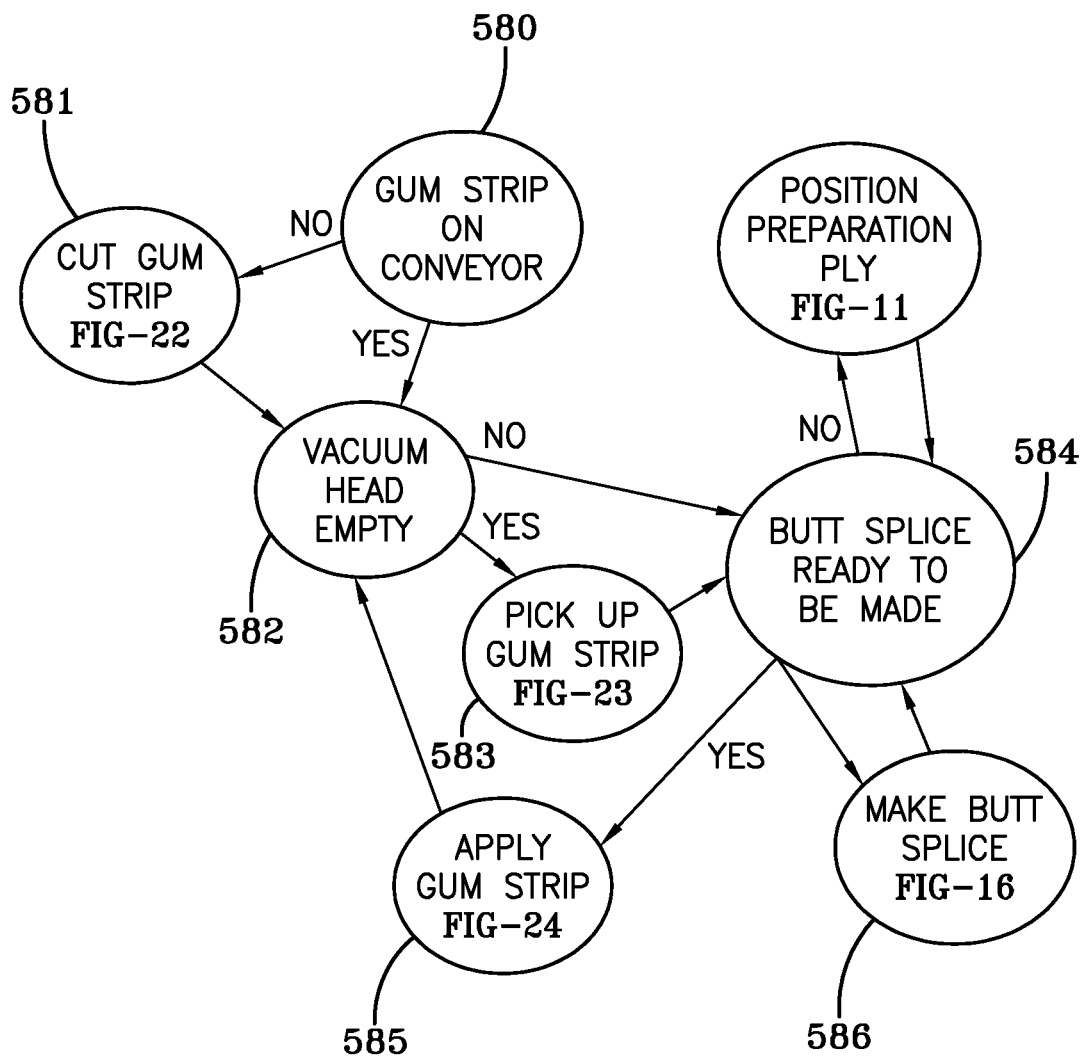
FIG. 25 is a state diagram illustrating the operation of the control system of FIG. 9 for simultaneously operating the butt splicer and gum strip applier of FIG. 5.

Several of the above processes and subroutines may occur simultaneously. For example, while a butt splice 40 is being made (FIG. 16) and a gum strip 42 is being applied over a previously made butt splice (FIG. 24), another gum strip 42 may be cut to size and moved into the gum strip applier 44 (FIGS. 22 & 23). FIG. 25 is a state diagram of a program for the controller 98 permitting several operations or subroutines to operate simultaneously.

If, at 580, there is no gum strip 42 on the gum strip conveyor 142, the controller 98 may execute, at 581, the subroutine of FIG. 22 to cut a gum strip to length. If a gum strip 42 is on the conveyor 142, the controller 98 may determine, at 582, whether the vacuum head 182 is empty; and if so, may execute, at 583, the subroutine of FIG. 23 to pick up the gum strip from the conveyor 142. If the vacuum head 182 is holding a gum strip 42, the controller 98, at 584, may determine whether a butt splice 40 is in position and ready to be made. If so, the controller 98, at 585, 586, may proceed to make a butt splice 40 by executing the butt splice subroutine of FIG. 16 and simultaneously apply a gum strip 42 to a previously made butt splice 40 by executing the subroutine of FIG. 24. If the controller 98, at any time, detects, at 584, that a butt splice 40 is not in position and ready to be made, the controller may bring a new cut piece 32 into the butt splicer 36 by executing the position preparation ply subroutine of FIG. 11.

The location of the gum strip applier 44 may be adjusted with respect to the butt splicer 36 to accommodate different widths of calendered material supplied to the infeed conveyor 34. Referring to FIG. 19, each side of the gum strip applier frame 127 may have grooved rollers 136 mounted on opposite sides of a linear guide 137 attached to the base 128. As shown in FIG. 18, a ball screw and nut assembly 138 may be mounted to the base 128. A handwheel 139 may be operatively connected to the ball screw nut and may be rotatably mounted to the frame 127. Rotation of the handwheel 139 may rotate the ball screw nut to move the frame 127 and the components supported thereby with respect to the base 128 and the butt splicer 36. Thus, calendered material of different widths may be readily accommodated. When the location of the frame 127 and gum strip conveyor 142 is changed, feeding of the gum strip 42 from the preparation equipment 48 (FIG. 5) may also be adjusted, for example, by moving the location of the preparation equipment.

When making large (e.g., larger than 30") pneumatic tires, as described above, calendered wire treatments may be stitched together to make a carcass band large enough to encompass the tire building drum. Large pneumatic tires (57" and 63" rim diameters) may have five or six sheets of calendered material stitched together. For example, a pneumatic tire with five sheets may have four prep splices and one builders splice. The prep splices may be uniform and consistent these splices are cut, aligned, and "zipper" stitched by precision machinery. The builders splice may be inconsistent since this splice is cut, aligned, and zipper stitched by hand. In cured pneumatic tires, a perfect splice may achieve uniform spacing close to what the "as calendered" one-piece material achieves. This is called 100% spacing. If zipper stitched material spreads more than the distance between adjacent cords, the splice may be rated on a percentage stretch level. Splices that approach 100% spacing produce increased durability of the tire casing.

As described above, conventional methods rely on human tire builders to hand cut ply treatment between the steel cords, splitting the rubber between those cords that may be only 0.040" of an inch thick. This may result in inconsistent rubber amounts being left that are stitched together and splices that vary in spacing a large amount. A splice in accordance with the present invention may allow human tire builders to use wire cords in the ply treatment as a guide for cutting each side to be joined flush against the wire cord thereby leaving no material within the splice to be stitched. A 0.020" wrap around gum strip may be applied around the guide cord to both sides of the splice resulting in uniform gauge between the guide cords to be zipper stitched. Splice quality and consistency may be greatly improved.

Figure 1:
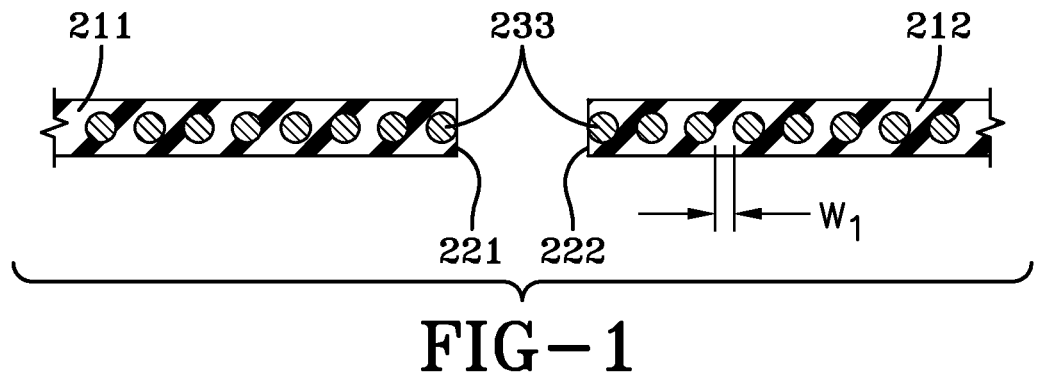
FIG. 1 schematically shows two ply segments placed adjacent each other.
Figure 2:
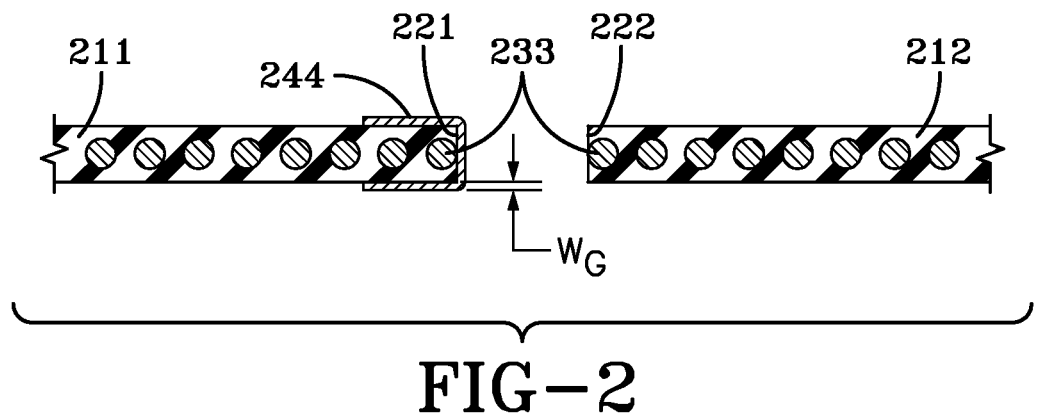
FIG. 2 schematically shows one edge of one of the ply segments prepared for joining.
Figure 3:
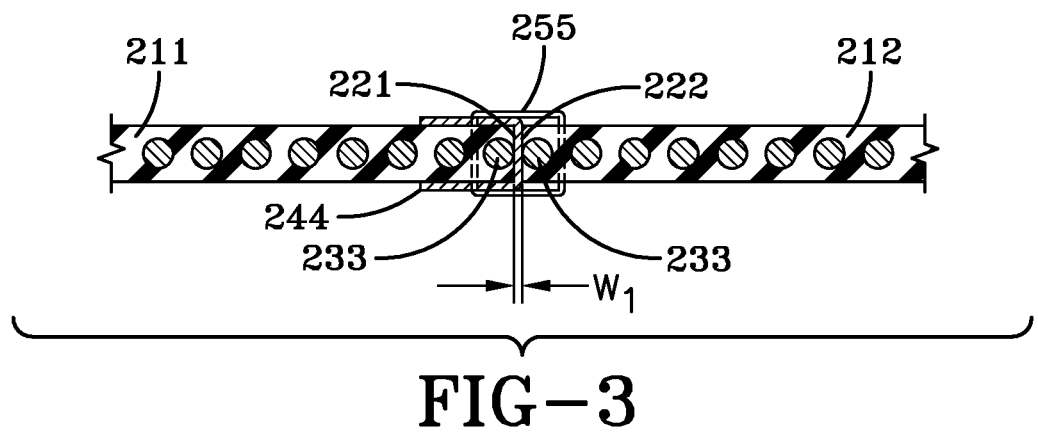
FIG. 3 schematically shows a butt splice in accordance with the present invention.

As shown in FIGS. 1-3, both edges 221, 222 of two plies 211, 212 to be joined may be shaved such that the nearest wire cords 233 are exposed at the edges (FIG. 1). These plies 211, 212 may have a substantially uniform spacing $W_1$ between the wire cords. Only one edge 221 may then be wrapped by a gum strip 244 having a nominal thickness $W_S$ equal to the spacing $W_1$ between the wire cords of the plies 211, 212 (FIG. 2). The gum strip 244 may be a material at least 20% softer than the rubber, or substrate, material of the plies 211, 212. The gum strip 244 may wrap around the edge 221 such that the gum strip forms a U-shaped structure in section that allows the gum strip to extend from a first side of the ply 211 over the edge 221 of that ply to a second side of that ply 211 (FIG. 2). The edges 221 may be placed in abutting relationship with the other ply 212 with the gum strip 244 therebetween (FIG. 3). The plies 211, 212 may thereby be stitched together while preserving or maintaining the uniform spacing $W_1$ between the wire cords. These stitches 255 may each extend from a first planar side of the first ply 211 to a first planar side of the second ply 212 and from the gum strip 244 to the first planar side of the second ply (FIG. 3).

While the present invention has been illustrated by a description of various examples and while these examples have been described in considerable detail, it is not the intention of Applicant to restrict or in any way limit the scope of the appended claims to such detail. Additional advantages and modifications will readily appear to those skilled in the art. For example, in a described example, the engagement actuators 85, 90 and clamping actuator 82 are described as pneumatic cylinders; as will be appreciated, in alternative example, those actuators may be hydraulic actuators or electromechanical drive systems or other suitable drive systems.

Therefore, the present invention, in its broadest aspects, is not limited to the specific details shown and described. Consequently, departures may be made from the details described herein without departing from the spirit and scope of the claims which follow.

What is claimed:

1. An apparatus for applying a gum strip at a first splice edge of a ply thereby splicing the first splice edge to a second opposite splice edge of the ply at a butt joint, the apparatus comprising:
    a conveyor for providing gum strips having a desired length and thickness; and
    a transfer device for automatically removing the gum strip from the gum strips provided by the conveyor and placing the gum strip at the butt joint, the transfer device wrapping the gum strip around the first splice edge such that the gum strip forms a U-shaped structure in section that allows the gum strip to extend from a first planar side of the ply over the first splice edge to a second opposite planar side of the ply,
    the gum strip being constructed of a material at least 20% softer than a substrate material of the ply, the ply having predetermined uniform spacing between wire cords in the ply, the predetermined uniform spacing being equal to a nominal thickness of the gum strip,
    the first splice edge being placed in abutting relationship to the second splice edge with the first splice edge being stitched to the second splice edge such that stitches each extend from the first planar side of the first splice edge of the ply, through the gum strip, to the first planar side of the second splice edge of the ply thereby positioning the first splice edge relative to the second splice edge for curing the first splice edge to the second splice edge.

2. The apparatus as set forth in claim 1 wherein the transfer device comprises a vacuum head.

3. The apparatus as set forth in claim 2 wherein the vacuum head is resiliently mounted to the transfer device to provide a force against the gum strip upon the gum strip being placed at the butt joint.

4. The apparatus as set forth in claim 1 further comprising a cutter for automatically cutting the gum strips to the desired length.

5. The apparatus as set forth in claim 1 wherein further comprising a controller operatively connected to the conveyor and the transfer device to operate the conveyor and the transfer device.

* * * * *